(12) United States Patent
Umehara et al.

(10) Patent No.: US 12,510,402 B2
(45) Date of Patent: Dec. 30, 2025

(54) WEIGHT MEASURING DEVICE

(71) Applicant: KYOCERA Corporation, Kyoto (JP)

(72) Inventors: Masanori Umehara, Ebina (JP);
Hiroyuki Asada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 478 days.

(21) Appl. No.: 18/002,811

(22) PCT Filed: Jun. 3, 2021

(86) PCT No.: PCT/JP2021/021164
§ 371 (c)(1),
(2) Date: Dec. 21, 2022

(87) PCT Pub. No.: WO2021/261201
PCT Pub. Date: Dec. 30, 2021

(65) Prior Publication Data
US 2023/0243694 A1 Aug. 3, 2023

(30) Foreign Application Priority Data
Jun. 26, 2020 (JP) .................... 2020-110646

(51) Int. Cl.
*G01G 23/18* (2006.01)
*G01G 21/28* (2006.01)

(52) U.S. Cl.
CPC ........... *G01G 23/18* (2013.01); *G01G 21/28* (2013.01)

(58) Field of Classification Search
CPC ........ G01G 23/18; G01G 21/28; G01G 21/22; G01G 19/52; G01G 21/23

USPC ........................................ 177/238
See application file for complete search history.

(56) References Cited

U.S. PATENT DOCUMENTS

| 5,153,585 A | * | 10/1992 | Negishi | G01G 19/4144 |
| | | | | 705/416 |
| 11,816,714 B2 | * | 11/2023 | Peng | H04L 67/568 |
| 2005/0075954 A1 | | 4/2005 | Matsumoto et al. | |
| 2016/0349105 A1 | * | 12/2016 | Oneda | G01G 21/22 |
| 2020/0349105 A1 | * | 11/2020 | Hsu | G06F 13/4295 |

FOREIGN PATENT DOCUMENTS

| JP | S54-166355 U1 | 11/1979 |
| JP | S56-167224 U1 | 12/1981 |
| JP | S57-063423 A | 4/1982 |
| JP | H02-206729 A | 8/1990 |
| JP | 2004-020462 A | 1/2004 |
| JP | 2005-112499 A | 4/2005 |
| JP | 2006-071391 A | 3/2006 |
| JP | 2018-185333 A | 11/2018 |

* cited by examiner

*Primary Examiner* — Jacques M Saint Surin
(74) *Attorney, Agent, or Firm* — Studebaker Brackett PLLC

(57) ABSTRACT

In order to ensure communication performance, a weight measuring device 1 includes a weight measurer configured to have a measurement target object placed thereon and measure a weight of the measurement target object, a communication module configured to transmit a measurement value of the weight of the measurement target object measured by the weight measurer by wireless communication, and an arrangement unit formed in an upper part of the weight measurer, the arrangement unit being configured to have at least an antenna of the communication module disposed on an upper side of the weight measurer.

16 Claims, 27 Drawing Sheets

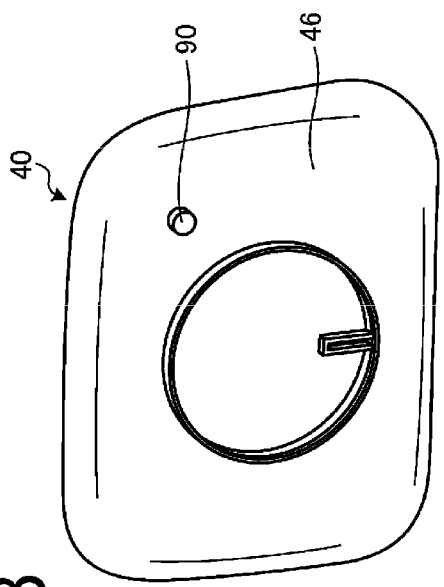
FIG. 21A
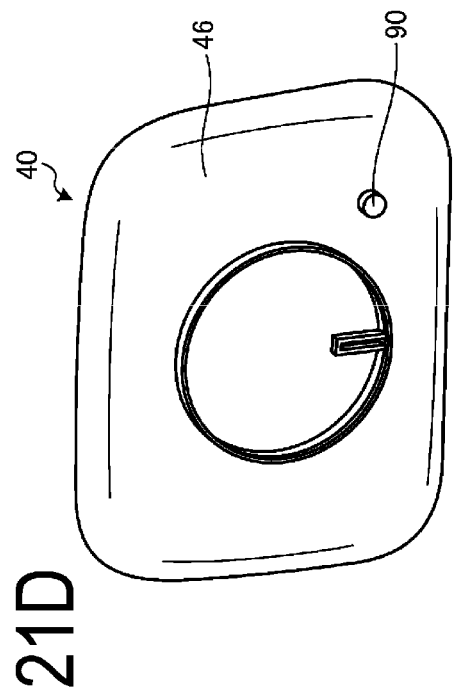
FIG. 21B
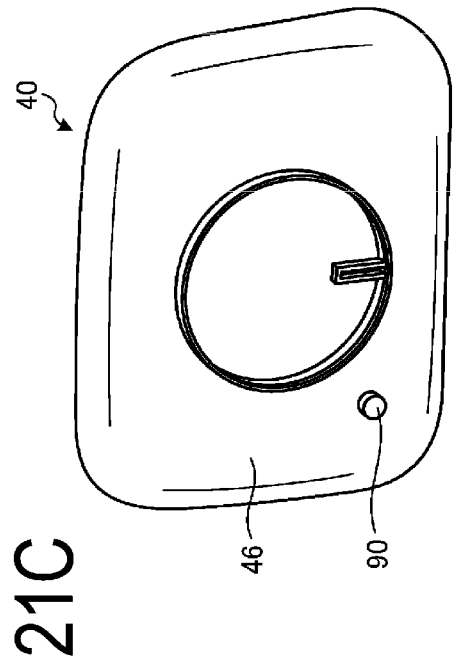
FIG. 21C
FIG. 21D

WEIGHT MEASURING DEVICE

TECHNICAL FIELD

The present disclosure relates to a weight measuring device that can transmit weight measurement value.

BACKGROUND OF INVENTION in recent years, convenience in managing and ordering consumables has been increased by using the Internet to transmit information on the remaining amount of the consumables to a warehouse, a vendor, a manufacturer, or the like that manages the inventory of the consumables, and to order a necessary amount of the consumables as appropriate depending on the consumption of the consumables. For example, the residual/stock management and ordering system described in Patent Document 1 includes a weight sensor detecting the weight of objects, manages the remaining amount of the objects based on the weight detected by the weight sensor, controls the stock of the objects to keep the objects ready for use, and places orders for the objects, so that the system performs management of remaining supply/stock, order management, and purchase support in a consistent manner.

CITATION LIST

Patent Literature

Patent Document 1: JP 2005-112499 A

SUMMARY

Problem to be Solved

Here, the detection result of the weight detected by the weight sensor can be transmitted to a network connected to an external device such as a server performing management of stock, for example, by wireless communication. However, in transmitting information about the remaining amount of consumables by wireless communication, the consumables may interfere with the communication by radio waves. Therefore, in transmitting the information about the remaining amount of consumables by wireless communication, there has been room for improvement in terms of ensuring communication performance.

The present invention has been made in view of the foregoing, and an object thereof is to provide a weight measuring device that can ensure communication performance.

Solution to Problem

A weight measuring device according to an aspect includes a weight measurer configured to have a measurement target object placed thereon and measure a weight of the measurement target object, a communicator configured to transmit a measurement value of the weight of the measurement target object measured by the weight measurer, and an arrangement unit formed in an upper part of the weight measurer, the arrangement unit being configured to have at least an antenna of the communicator disposed on an upper side of the weight measurer.

BRIEF DESCRIPTION OF THE DRAWINGS

FIG. 21 illustrates perspective views of trays 40 in each of which an identification portion corresponding to the type of the measurement target object to be placed is disposed.

DESCRIPTION OF EMBODIMENTS

Embodiments of a weight measuring device according to the present invention will be described in detail below based on the drawings. Note that the embodiments are not intended to limit the present invention. Furthermore, constituent elements in the embodiments described below include those that can be replaced and easily conceived by a person skilled in the art and include those that are substantially identical to said constituent elements.

Embodiment

In the following description, a vertical direction of a weight measuring device 1 under normal use conditions will be described as the vertical direction in the weight measuring device 1, an upper side of the weight measuring device 1 under normal use conditions will be described as the upper side in the weight measuring device 1, and a lower side of the weight measuring device 1 under normal use conditions will be described as the lower side in the weight measuring device 1. A horizontal direction of the weight measuring device 1 under normal use conditions will be described as the horizontal direction in the weight measuring device 1. Further, a side in the horizontal direction on which an arrangement unit 50 to be described later is located will be described as the back side of the weight measuring device 1, and a side in the horizontal direction opposite to the side on which the arrangement unit 50 is located will be described as the front side of the weight measuring device 1.

Figure 1:
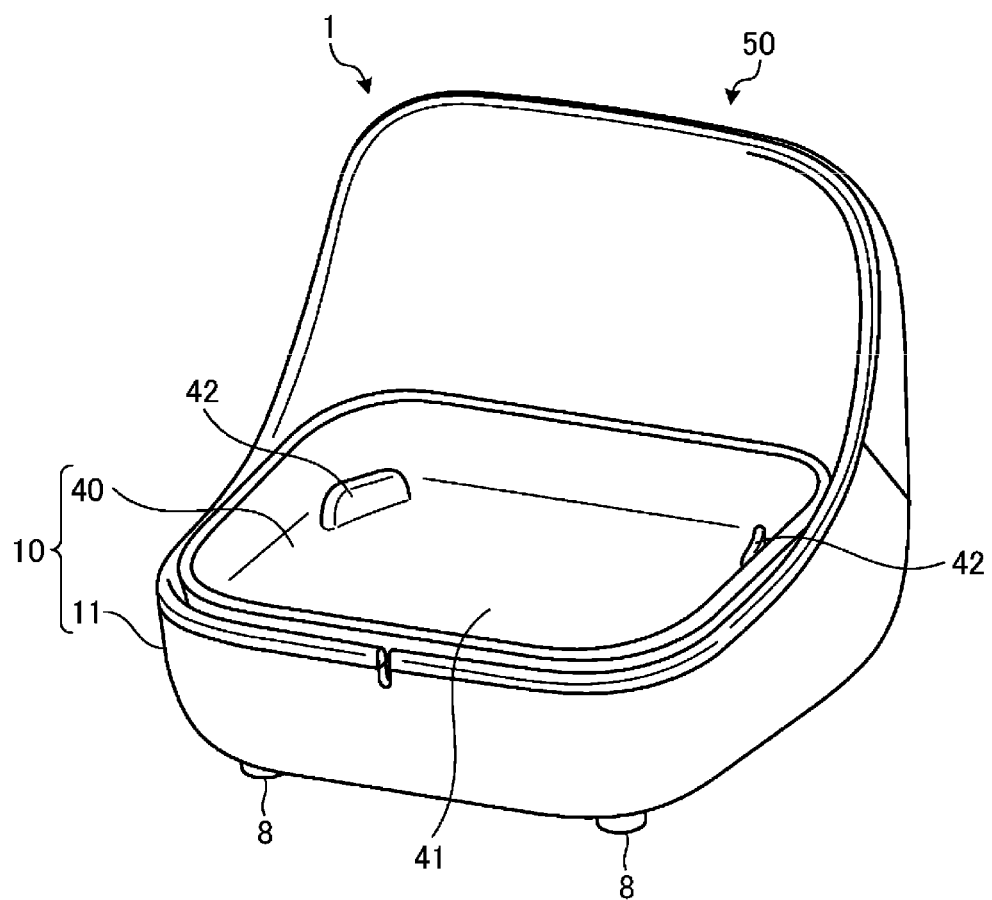
FIG. 1 is a perspective view of a weight measuring device according to an embodiment as viewed from the front side.
Figure 2:
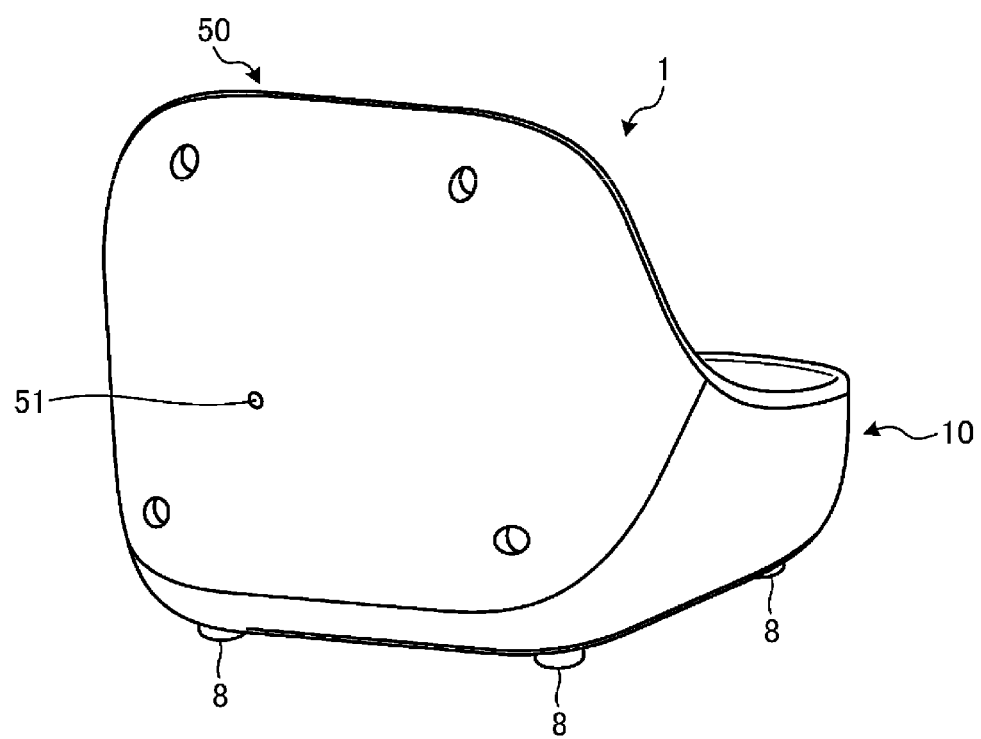
FIG. 2 is a perspective view of a weight measuring device according to an embodiment as viewed from the back side.
Figure 3:
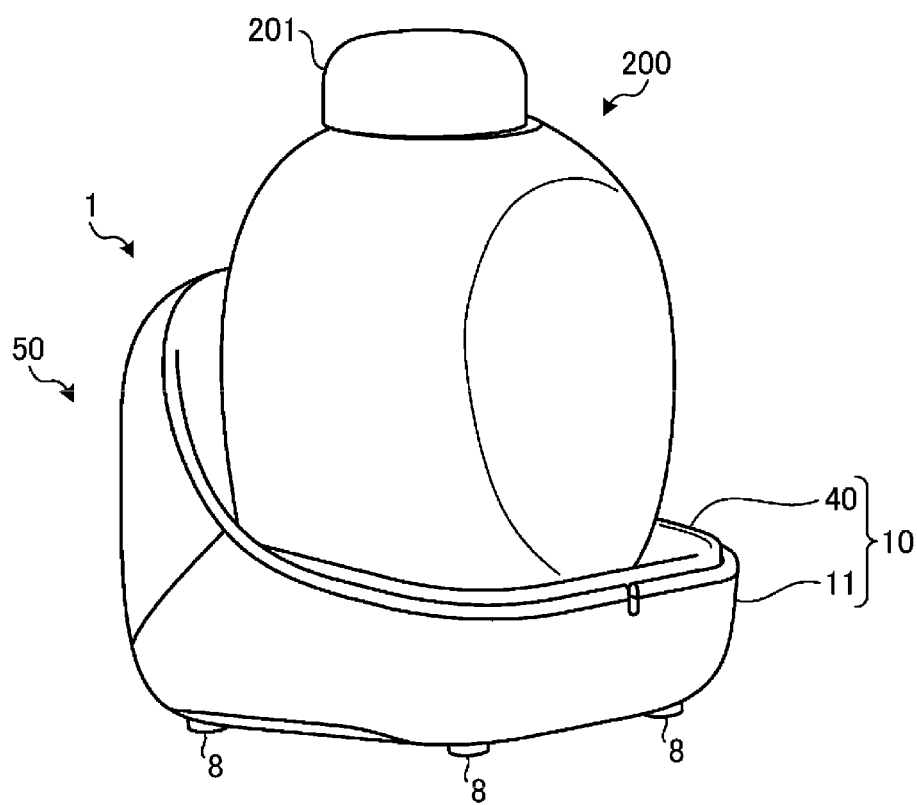
FIG. 3 is a perspective view of a weight measuring device on which a measurement target object is placed as viewed from the front side.
Figure 4:
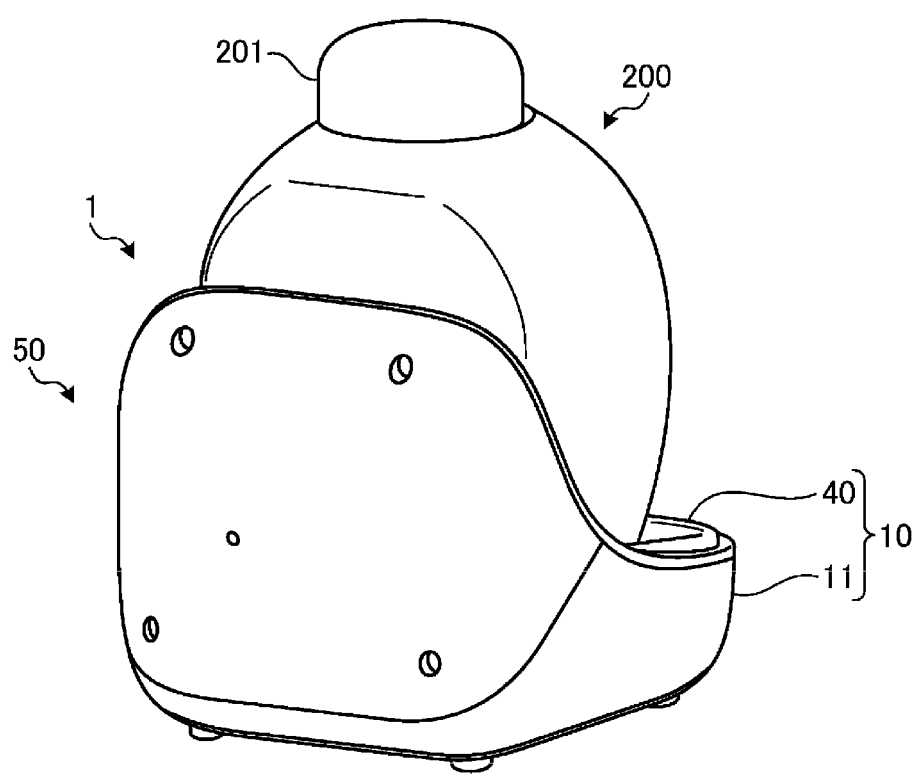
FIG. 4 is a perspective view of a weight measuring device on which a measurement target object is placed as viewed from the back side.

FIG. 1 is a perspective view of the weight measuring device 1 according to an embodiment as viewed from the front side. FIG. 2 is a perspective view of the weight measuring device 1 according to an embodiment as viewed from the back side. FIG. 3 is a perspective view of the weight measuring device 1 on which a measurement target object 200 is placed as viewed from the front side. FIG. 4 is a perspective view of the weight measuring device 1 on which the measurement target object 200 is placed as viewed from the back side. In the present embodiment, the weight measuring device 1 can measure the weight of the measurement target object 200 placed on the weight measuring device 1 and transmit the measurement value of the measured weight to an external device by wireless communication. The weight measuring device 1 measuring weight includes a weight measurer 10 and the arrangement unit 50. The weight measurer 10 can have the measurement target object 200 placed thereon and measure the weight of the measurement target object 200. The arrangement unit 50 is formed toward the upper side from the weight measurer 10, and a communication module 60 to be described later is disposed inside the arrangement unit 50.

In the present embodiment, the weight measurer 10 is formed in a substantially rectangular shape having arc-shaped corners as viewed in the vertical direction. The arrangement unit 50 is formed by extending toward the upper side from one side of a rectangle that is the shape of the weight measurer 10. In contrast, among the four sides of the rectangle that is the shape of the weight measurer 10, the three sides excluding the side on which the arrangement unit 50 is disposed are open on the upper side.

The weight measurer 10 includes a weight measurer body 11 including a weight sensor 30 to be described later, and a tray 40 that is a placement portion on which the measurement target object 200 is placed. The weight measurer body 11 is a base portion of the weight measurer 10 and formed in a substantially rectangular shape having arc-shaped corners as viewed in the vertical direction. A plurality of rubber legs 8 are disposed on the lower side surface of the weight measurer body 11, each of the rubber legs 8 being a member provided with a rubber material and serving as a leg of the weight measuring device 1. The arrangement unit 50 formed extending toward the upper side from one side of the weight measurer 10 is formed toward the upper side from the weight measurer body 11.

The tray 40 is formed in a substantially rectangular shape having arc-shaped corners as viewed in the vertical direction, the same as or similar to the shape of the weight measurer 10 as viewed in the vertical direction. Also, the tray 40 is formed in a shape such that the outer periphery thereof rises toward the upper side, and thereby the tray 40 can hold an object placed on the tray 40.

The tray 40 is disposed on the upper side of the weight measurer body 11, and is removable from the weight measurer body 11. The measurement target object 200 to be measured by the weight measuring device 1 is placed on the tray 40 included in the weight measurer 10 at the time of weight measurement. A holding member 42 holding the measurement target object 200 is formed on an upper surface 41 of the tray 40 on which the measurement target object 200 is placed. When the measurement target object 200 is placed on the weight measurer 10, the arrangement unit 50 formed toward the upper side from the weight measurer 10 overlaps with the measurement target object 200 in the horizontal direction.

Figure 5:
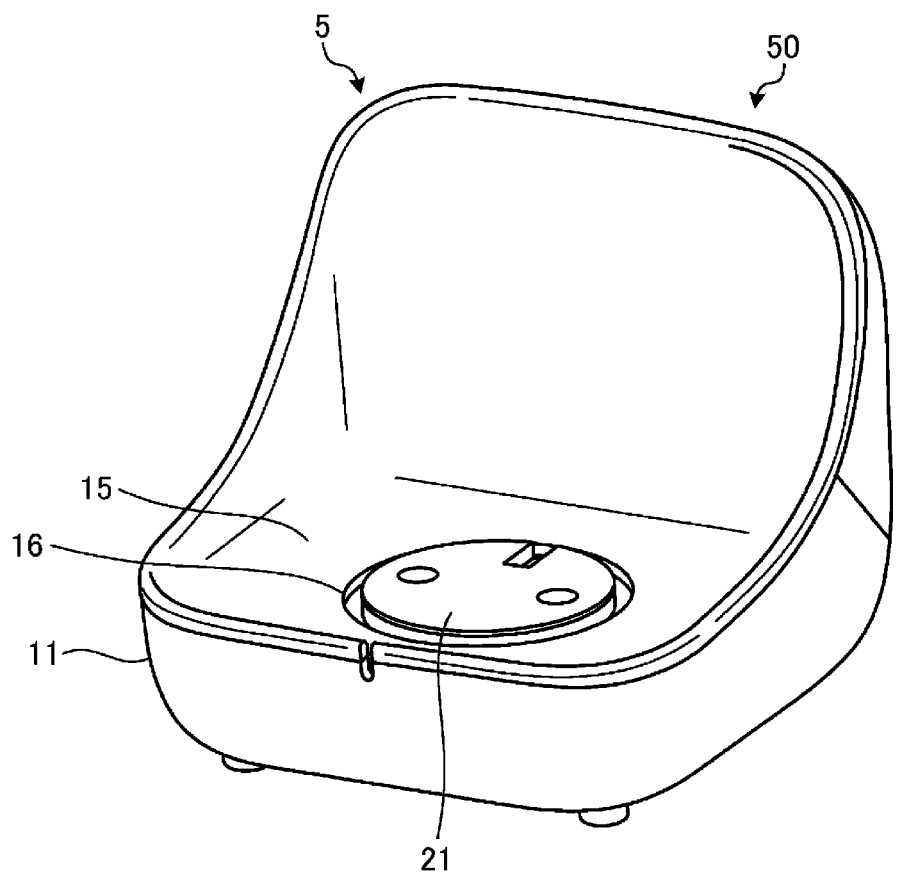
FIG. 5 is a perspective view illustrating the weight measuring device illustrated in FIG. 1 with a tray removed.

FIG. 5 is a perspective view illustrating the weight measuring device 1 illustrated in FIG. 1 with the tray 40 removed. The tray 40 (see FIG. 1) is removable from the weight measurer body 11. Portions of the weight measuring device 1 other than the tray 40 constitute a body 5 of the weight measuring device 1. That is, the weight measuring device 1 includes the body 5 and the tray 40 that is removable from the body 5. Specifically, a tray receiver 21 is disposed on an upper surface 15 side of the weight measurer body 11, and the tray 40 is removable from the tray receiver 21. The tray receiver 21 is formed in a substantially circular shape as viewed in the vertical direction, and is disposed near the center of the upper surface 15 of the weight measurer body 11.

Figure 6:
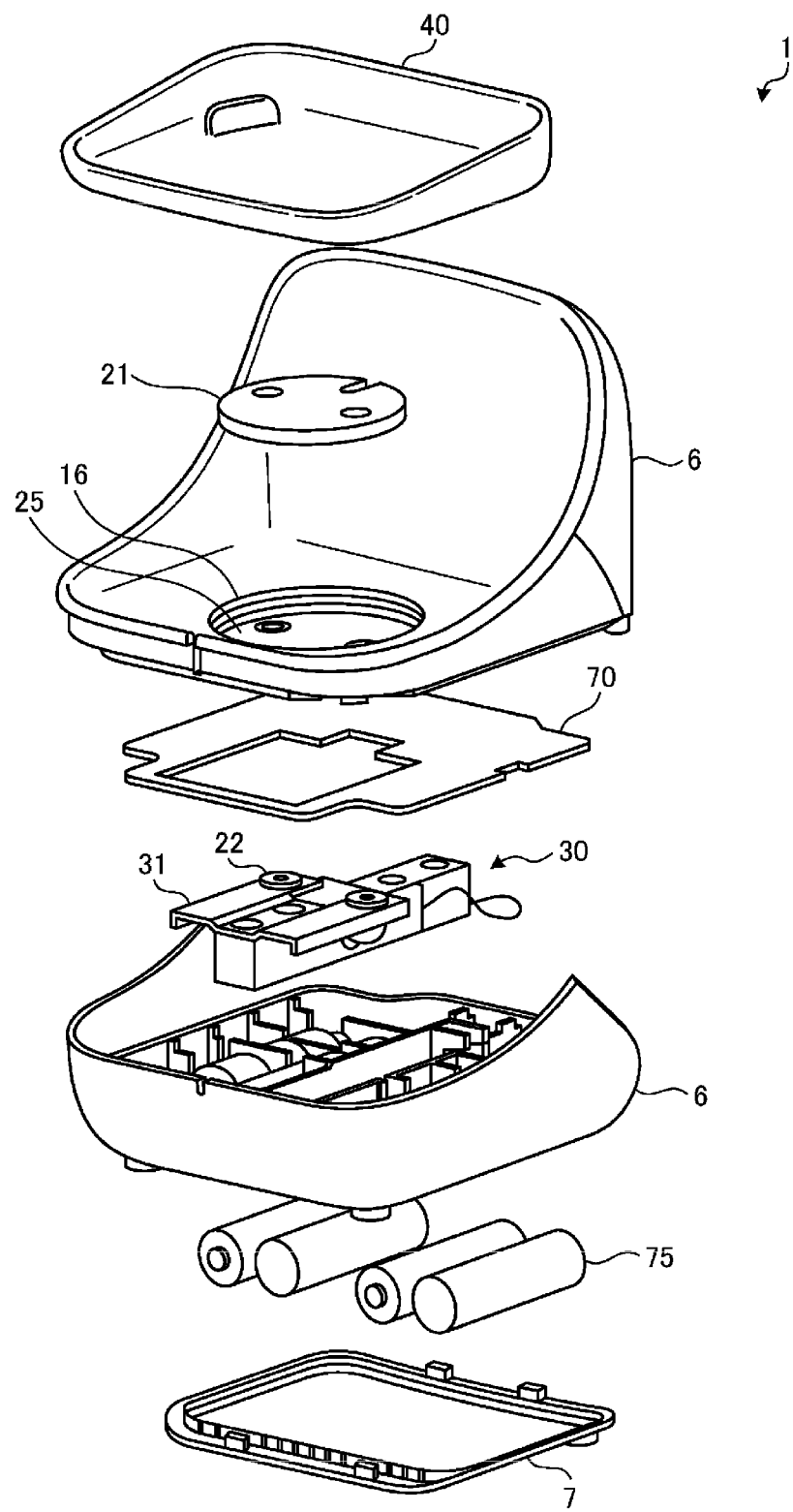
FIG. 6 is an exploded view of the weight measuring device illustrated in FIG. 1.

FIG. 6 is an exploded view of the weight measuring device 1 illustrated in FIG. 1. The weight measuring device 1 includes a housing 6, the tray 40, the tray receiver 21, a substrate 70, and the weight sensor 30. The housing 6 continuously forms the outline of the weight measurer 10 and the arrangement unit 50. The substrate 70 and the weight sensor 30 are disposed inside a portion forming the weight measurer 10 in the housing 6. The weight sensor 30 is a means for detecting weight when the weight of the measurement target object 200 is measured with the weight measuring device 1. In the present embodiment, a so-called load cell that converts a detected load into an electrical signal and outputs the electrical signal is used as the weight sensor 30. The weight sensor 30 can measure the weight of the measurement target object 200 placed on the tray 40 by detecting the load received by the tray 40.

Specifically, the tray receiver 21 can be mounted on the weight sensor 30, and the tray 40 can be mounted on the tray receiver 21. Thus, the weight sensor 30 can receive the load received by the tray 40 via the tray receiver 21. Accordingly, the weight sensor 30 can measure the weight of the measurement target object 200 placed on the tray 40. That is, the tray 40, which is a placement portion on which the measurement target object 200 is placed, sends the load from the measurement target object 200 placed on the tray 40 to the weight sensor 30, and the weight sensor 30 measures the load sent from the tray 40 to measure the weight of the measurement target object 200.

The substrate 70 includes wiring of an electrical circuit through which electric power and electric signals in the weight measuring device 1 flow. The weight sensor 30 is electrically connected to the substrate 70. In the present embodiment, the weight measuring device 1 uses a battery 75, which is commercially-available, as a power supply. A plurality of batteries 75 is used, and the plurality of batteries 75 is disposed inside the weight measurer body 11. A battery lid 7, which is a lid to be detached when the batteries 75 are placed in and taken out of the weight measurer body 11, is disposed on a lower surface of the weight measurer body 11.

Figure 7:
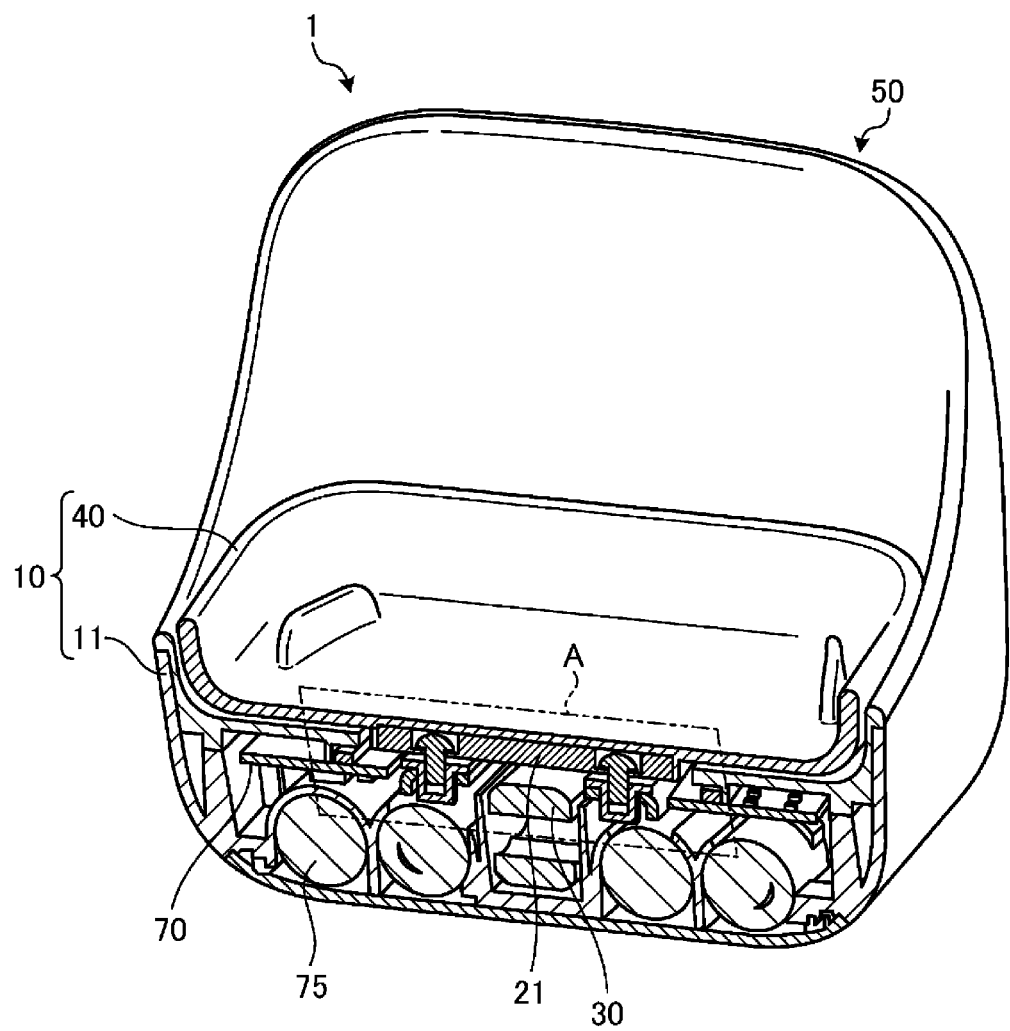
FIG. 7 is an explanatory diagram illustrating the cross-section shape of a weight measurer in the weight measuring device illustrated in FIG. 1.
Figure 8:
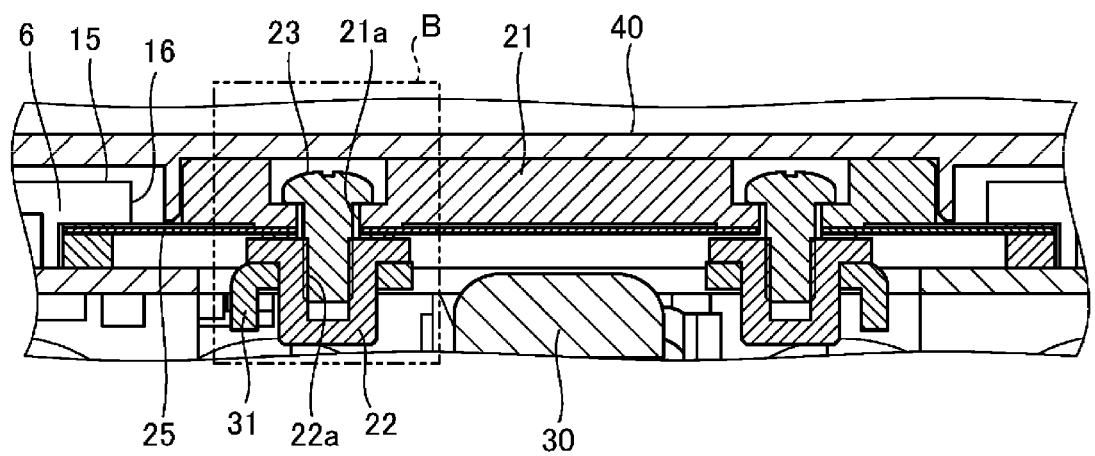
FIG. 8 is a detailed view of a portion A in FIG. 7.
Figure 9:
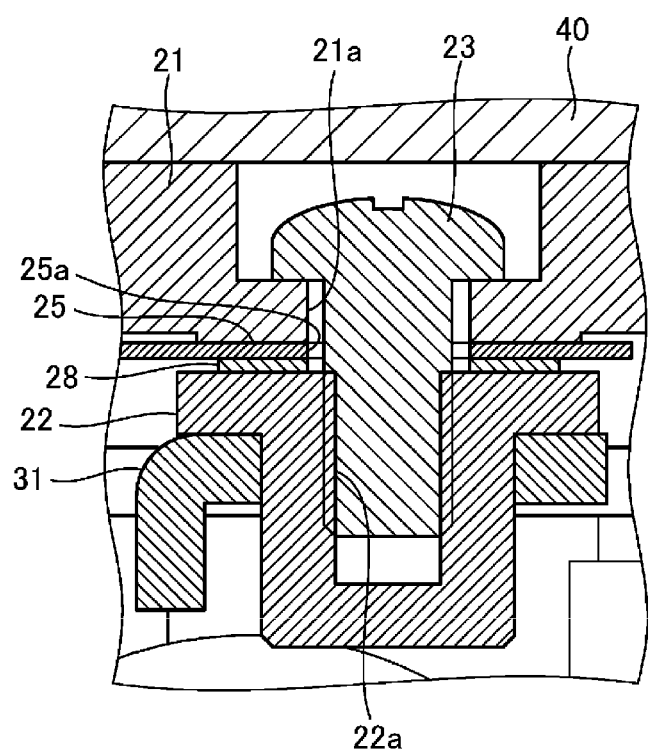
FIG. 9 is a detailed view of a portion B in FIG. 8.

FIG. 7 is an explanatory diagram illustrating the cross-section shape of the weight measurer 10 in the weight measuring device 1 illustrated in FIG. 1. FIG. 8 is a detailed view of the portion A in FIG. 7. FIG. 9 is a detailed view of the portion B in FIG. 8. The weight measurer 10 is a portion configured to measure weight in the weight measuring device 1, and includes the tray 40, the tray receiver 21, the weight sensor 30, a nut member 22, and the housing 6. The nut member 22 is disposed inside the housing 6, and is used as a lower part of the weight measurer 10 that sends a load input from the outside of the housing 6 to the weight sensor 30. The nut member 22 is mounted on a load receiver 31 included in the weight sensor 30, and the weight sensor 30 can measure the weight of the measurement target object 200 by measuring the load sent from the nut member 22 to the load receiver 31.

The tray receiver 21 is disposed on the upper side of the nut member 22, and is used as an upper part of the weight measurer 10 that sends the load from the measurement target object 200 to the nut member 22. The tray 40 is disposed on the upper side of a portion constituting the weight measurer 10 in the housing 6, and the weight sensor 30 and the nut member 22 are disposed inside the portion constituting the weight measurer 10 in the housing 6.

The weight measurer 10 further includes a flexible sheet 25, and the tray receiver 21 sends the load from the measurement target object 200 to the nut member 22 via the flexible sheet 25. Specifically, an opening hole 16 (see FIG. 6) penetrating the housing 6 from the inner side to the outer side is formed in the portion constituting the weight measurer 10 in the housing 6, and in the present embodiment, the opening hole 16 is a hole having a substantially circular shape. The opening hole 16 formed in the housing 6 is closed by the flexible sheet 25 (see FIG. 6).

The flexible sheet 25 is a sheet-shaped member having flexibility, and, for example, a sheet such as a urethane rubber sheet that can ensure watertightness is used as the flexible sheet 25. The flexible sheet 25 is disposed inside the housing 6, and closes the opening hole 16 on the inner side of the housing 6. The tray receiver 21 and the nut member 22 are disposed opposite each other through the flexible sheet 25. The tray receiver 21 is formed in a substantially circular plate-like shape having a diameter slightly smaller than the diameter of the opening hole 16, and is disposed to fit in the opening hole 16. Accordingly, the lower surface of the tray receiver 21 is in contact with the upper surface side of the flexible sheet 25 that closes the opening hole 16 on the inner side of the housing 6.

The nut member 22 is disposed on the lower side of the flexible sheet 25, and mounted on the load receiver 31 included in the weight sensor 30. The tray receiver 21 and the nut member 22 disposed opposite each other through the flexible sheet 25 are connected to each other by a screw 23 that is a connection member. Specifically, a through hole 21a through which the screw 23 passes is formed in the tray receiver 21, and a screw hole 22a into which the screw 23 is screwed is formed at the nut member 22. A connecting hole 25a through which the screw 23 passes is formed in the flexible sheet 25. Accordingly, with the flexible sheet 25 interposed between the tray receiver 21 and the nut member 22, the screw 23 passes through the through hole 21a of the tray receiver 21 and the connecting hole 25a of the flexible sheet 25, and the screw 23 is screwed into the screw hole 22a of the nut member 22, thereby the tray receiver 21 and the nut member 22 are connected to each other by the screw 23.

Figure 10:
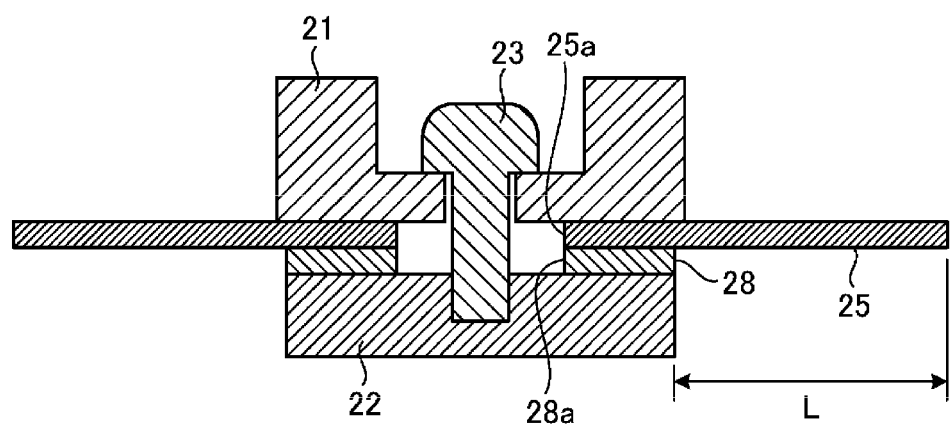
FIG. 10 is a schematic diagram illustrating a configuration of a connecting portion between a tray receiver and a nut member illustrated in FIG. 9.

FIG. 10 is a schematic diagram illustrating a configuration of a connecting portion between the tray receiver 21 and the nut member 22 illustrated in FIG. 9. The flexible sheet 25 is interposed between the tray receiver 21 and the nut member 22, and a double-sided tape 28 having watertightness is disposed between the flexible sheet 25 and the nut member 22. As in the case of the flexible sheet 25, a connecting hole 28a through which the screw 23 passes is formed in the double-sided tape 28. The screw 23 passes through the connecting hole 28a of the double-sided tape 28 located between the flexible sheet 25 and the nut member 22 to connect the tray receiver 21 and the nut member 22. Thus, the double-sided tape 28 located between the flexible sheet 25 and the nut member 22 adheres to the flexible sheet 25 on one side and to the nut member 22 on the other side. Accordingly, the nut member 22 adheres to the flexible sheet 25 via the double-sided tape 28.

Since the flexible sheet 25 and the double-sided tape 28 are interposed between the tray receiver 21 and the nut member 22 connected to each other by the screw 23, the tray receiver 21 and the nut member 22 are separated from each other at the positions of the connecting hole 25a of the flexible sheet 25 and the connecting hole 28a of the double-sided tape 28. That is, the tray receiver 21 and the nut member 22 are separated from each other by the thicknesses of the flexible sheet 25 and the double-sided tape 28 at the positions of the connecting hole 25a of the flexible sheet 25 and the connecting hole 28a of the double-sided tape 28.

A minimum distance L between a position where the flexible sheet 25 is attached to the housing 6 on the inner side of the housing 6 so as to close the opening hole 16 and a portion where the flexible sheet 25 adheres to the nut member 22 via the double-sided tape 28 against the nut member 22 is equal to or greater than a predetermined distance. In the flexible sheet 25, the minimum distance L between a position where the flexible sheet 25 is attached to the housing 6 on the inner side of the housing 6 and the nut member 22 satisfies L>0, for example.

Figure 11:
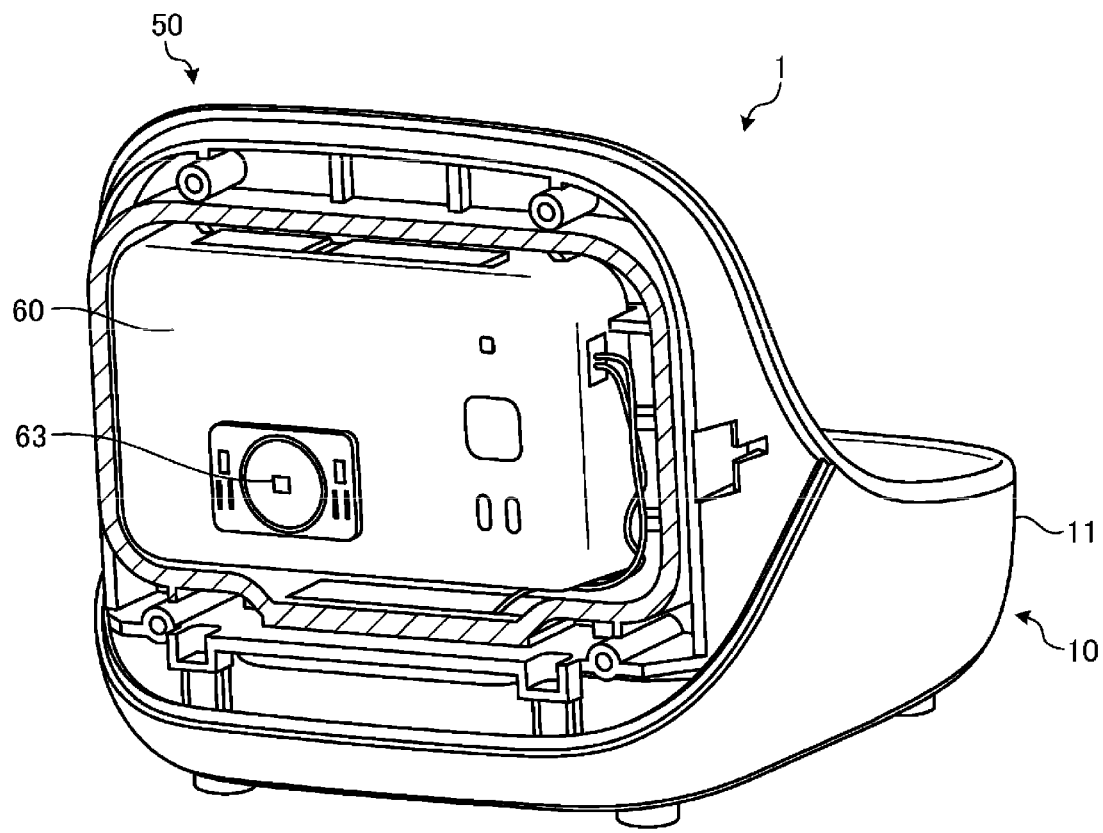
FIG. 11 is a perspective view of a communicator placement portion in the weight measuring device illustrated in FIG. 2.

FIG. 11 is a perspective view of the arrangement unit 50 in the weight measuring device 1 illustrated in FIG. 2. The communication module 60, which is a communicator that transmits a measurement value of the weight of the measurement target object 200 measured by the weight measurer 10, is disposed inside the arrangement unit 50. The communication module 60 is a module that performs wireless communication, and can transmit and receive any information by wireless communication using radio waves that are carrier waves. In the present embodiment, the communication module 60 can transmit a weight measurement value measured by the weight sensor 30 by wireless communication.

For example, a wireless communication standard such as a communication standard including LTE Cat. M1 is applied to the communication module 60. The wireless communication standard to be applied to the communication module 60 is preferably set in accordance with the usage pattern of the weight measuring device 1, or the like. The weight measuring device 1 transmits a weight measurement value measured by the weight sensor 30 through wireless communication by the communication module 60 to convey the weight measurement value of the measurement target object 200 to an external device (not illustrated) managing the measurement target object 200. In this case, the external device managing the measurement target object 200 is, for example, a device that determines the necessity of the replenishment of the measurement target object 200 based on the weight measurement value of the measurement target object 200.

The communication module 60 includes, on the back side thereof, a calibration switch 63 that is a switch for calibrating the weight measuring device 1. Calibration of the weight measuring device 1 is performed by pushing a thin rod-like object into a calibration switch hole 51 (see FIG. 2) formed on the back side of the arrangement unit 50.

The communication module 60 is disposed such that the position of the communication module 60 in the vertical direction is located on the upper side of the weight measurer 10. Thus, the position of the communication module 60 in the vertical direction is located on the upper side of the tray 40 included in the weight measurer 10.

Figure 12:
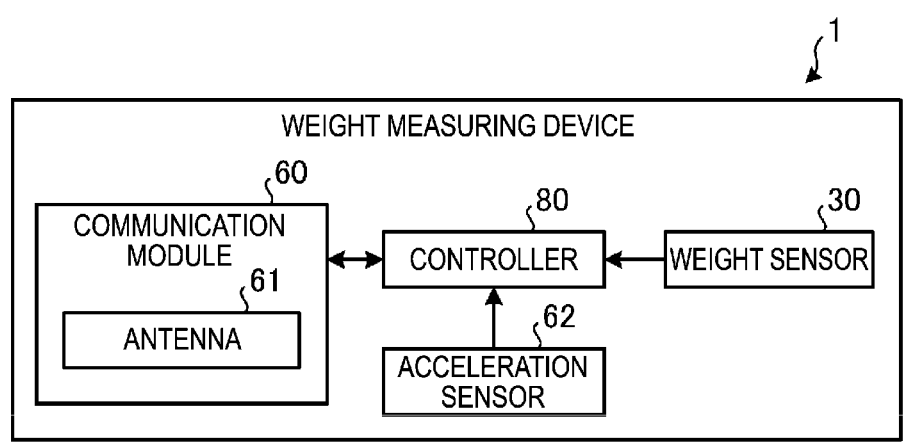
FIG. 12 is a block diagram illustrating a device configuration of a weight measuring device according to an embodiment.

FIG. 12 is a block diagram illustrating a device configuration of the weight measuring device 1 according to an embodiment. The weight measuring device 1 includes the weight sensor 30 disposed in the weight measurer 10, an acceleration sensor 62, the communication module 60 disposed in the arrangement unit 50, and a controller 80.

The controller 80 is an arithmetic processing unit including, for example, a central processing unit (CPU), a system-on-a-chip (SoC), a micro control unit (MCU), a field-programmable gate array (FPGA), and a coprocessor. The controller 80 loads a stored program into a memory and executes an instruction included in the program. The controller 80 includes an internal memory (not illustrated), and the internal memory is used for temporary storage of data in the controller 80.

The communication module 60 includes an antenna 61. The antenna 61 is a portion that transmits and receives radio waves when the communication module 60 transmits and receives information using radio waves. The communication module 60 converts information transmitted from the controller 80 into signals that can be transmitted from the antenna 61, and transmits the signals as radio waves from the antenna 61. The antenna 61 is integrally formed with the communication module 60, and the communication module 60 is disposed such that the position of the communication module 60 in the vertical direction is located on the upper side of the weight measurer 10. Thus, the antenna 61 is also disposed such that the position of the antenna 61 in the vertical direction is located on the upper side of the weight measurer 10, and on the upper side of the tray 40 included in the weight measurer 10.

The acceleration sensor 62 is mounted on the substrate 70 (see FIG. 6), and is an acceleration detector configured to detect the direction and magnitude of an acceleration acting on the acceleration sensor 62, that is, an acceleration acting on the weight measuring device 1. In the present embodiment, the acceleration sensor 62 is a triaxial acceleration sensor 62 configured to detect accelerations in three axis directions orthogonal to each other. The acceleration sensor 62 can be of a micro electro mechanical systems (MEMS) type based on piezo resistance, capacitance, piezoelectric element (piezoelectricity), or thermal detection, a servo type in which a movable coil is moved and returned to the original position thereof by a feedback current, a strain gauge type, or the like. The acceleration sensor 62 outputs a detection result to the controller 80. The controller 80 can perform various types of control based on the detection result of the acceleration sensor 62. In the present embodiment, the acceleration sensor 62 is included in the substrate 70, but the mounting position of the acceleration sensor 60 is not limited. For example, the acceleration sensor 62 may be installed in the communication module 60.

In the present embodiment, the weight measuring device 1 has the configuration as described above, and an example of the effects thereof will be described below. The weight measuring device 1 is used with the measurement target object 200 placed on the tray 40 included in the weight measurer 10. For example, the measurement target object 200, whose weight changes with the use of the measurement target object 200, is used. In the present embodiment, so-called hand soap that is liquid soap stored in a container is used as the measurement target object 200, and the measurement target object 200 includes the container of the hand soap. Since the liquid soap stored in the container decreases with use, the weight of the measurement target object 200, which is hand soap, decreases. The weight measuring device 1 measures the weight of the measurement target object 200 that changes as described above, and transmits, by wireless communication, a measurement value to an external device managing the measurement target object 200.

Specifically, when the weight of the measurement target object 200 is measured using the weight measuring device 1, the weight measuring device 1 is installed at a location where the hand soap as the measurement target object 200 is used, and the measurement target object 200 is placed on the tray 40 of the weight measuring device 1. Here, since the hand soap is used with water, the weight measuring device 1 using the hand soap as the measurement target object 200 is used in an environment in which wetting by water is highly likely, and thus the rubber legs 8 are disposed on the lower surface of the weight measuring device 1. This makes the weight measuring device 1 less likely to slip even in an environment that is slippery due to water. Also, the tray 40 is removable from the tray receiver 21, that is, removable from the body 5. Accordingly, even when the weight measuring device 1 is used in an environment in which wetting by water is highly likely, the tray 40 can be removed from the body 5 and washed.

The measurement target object 200 is held in a stable state by the holding member 42 formed in the tray 40. Further, since the weight measuring device 1 includes the arrangement unit 50 formed toward the upper side from the weight measurer 10, the measurement target object 200 placed on the tray 40 can be suppressed from falling down.

The measurement target object 200 is used in such a stable placement state as described above, and the weight thereof is measured by the weight measuring device 1. In the measurement of the weight of the measurement target object 200 by the weight measuring device 1, the tray 40 on which the measurement target object 200 is placed receives the load of the weight of the measurement target object 200 from the measurement target object 200, and the load received by the tray 40 is sent from the tray 40 to the tray receiver 21 on which the tray 40 is mounted.

The tray receiver 21 is connected to the nut member 22 via the flexible sheet 25 and double-sided tape 28, and the nut member 22 is mounted on the load receiver 31 of the weight sensor 30. The flexible sheet 25 has flexibility and can send the load received by the tray receiver 21 from the tray 40 to the load receiver 31 of the weight sensor 30 without restricting the vertical direction movement of the tray receiver 21 due to the load as much as possible. Accordingly, the load received by the tray receiver 21 from the tray 40 is sent to the weight sensor 30 via the flexible sheet 25 and the double-sided tape 28 without being restricted by the flexible sheet 25.

The load is sent from the tray receiver 21 to the nut member 22 mounted on the weight sensor 30 disposed inside the weight measurer body 11 via the flexible sheet 25, and the flexible sheet 25 closes the opening hole 16 formed at the housing 6. Thus, while the load from the tray receiver 21 is sent to the weight sensor 30 disposed inside the weight measurer body 11 through the opening hole 16 opening the housing 6, the upper surface 15 side of the weight measurer body 11 and the inner side of the weight measurer body 11 are separated from each other by the flexible sheet 25. Accordingly, even when the weight measuring device 1 is used in an environment in which contact with water is highly likely, water entry from the upper surface 15 side of the weight measurer body 11 into the interior of the weight measurer body 11 can be suppressed, and watertightness can be ensured.

The tray receiver 21 on which the tray 40 is mounted and the nut member 22 mounted on the weight sensor 30 are separated from each other at the positions of the connecting hole 25a formed in the flexible sheet 25 and the connecting hole 28a of the double-sided tape 28. Thus, when a load is sent from the tray receiver 21 to the nut member 22, the area of a portion through which the load is sent can be reduced, and surface pressure to the flexible sheet 25 and the double-sided tape 28 can be increased. Accordingly, the flexible sheet 25 and the double-sided tape 28 can reliably suppress water entry from the upper surface 15 side of the weight measurer body 11 into the interior of the weight measurer body 11, and more reliably ensure watertightness.

The weight sensor 30 disposed inside the weight measurer body 11 measures the magnitude of the load sent from the tray receiver 21. Since the load sent from the tray receiver 21 to the weight sensor 30 is based on the weight of the measurement target object 200, the weight sensor 30 to which the load has been sent from the tray receiver 21 measures the sent load as the weight of the measurement target object 200.

Note that the weight measurer 10 of the weight measuring device 1 includes the weight measurer body 11 including the weight sensor 30 that measures the weight of the measurement target object 200, and the tray 40 that is formed to be removable from the weight measurer body 11 and sends the load from the measurement target object 200 to the weight sensor 30. Thus, when a plurality of types of measurement target objects 200 whose weights are to be measured by the weight measuring device 1 are expected, a plurality of trays 40 are prepared according to the types of the measurement target objects 200 so that the tray 40 can be replaced according to the measurement target object 200 whose weight is to be measured. Accordingly, the measurement target object 200 can be stably placed on the tray 40 regardless of the type of the measurement target object 200, and the weight of the measurement target object 200 can be stably measured.

A measurement value of the weight of the measurement target object 200 measured by the weight sensor 30 is transmitted from the weight sensor 30 to the controller 80, and is further transmitted from the controller 80 to the communication module 60. The communication module 60 is ready for transmitting and receiving information by wireless communication to and from an external device capable of mutual wireless communication with the communication module 60. The external device in this case may be a device that is the final destination of the information such as an external device managing the measurement target object 200, or may be a relay device in the transmission of the information to the final destination. The communication module 60 transmits the measurement value of the weight from the controller 80 to an external device capable of mutual wireless communication with the communication module 60.

Figure 13:
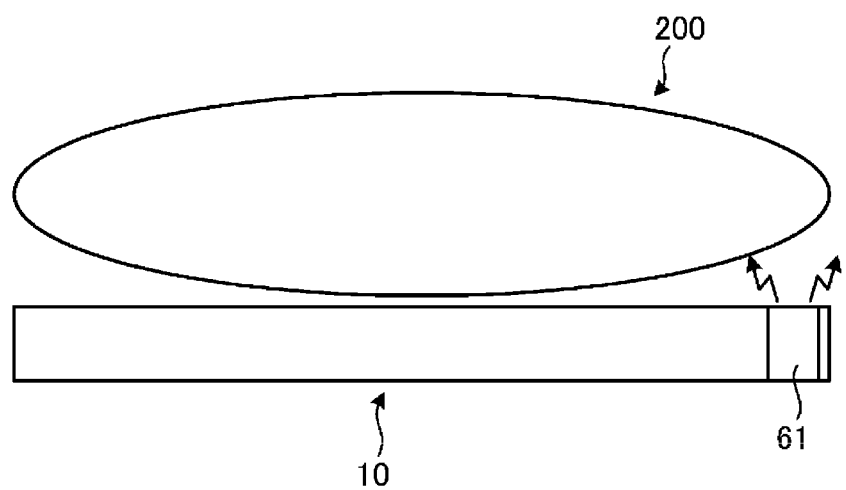
FIG. 13 is a schematic diagram illustrating a case in which an antenna is disposed in a weight measurer.
Figure 14:
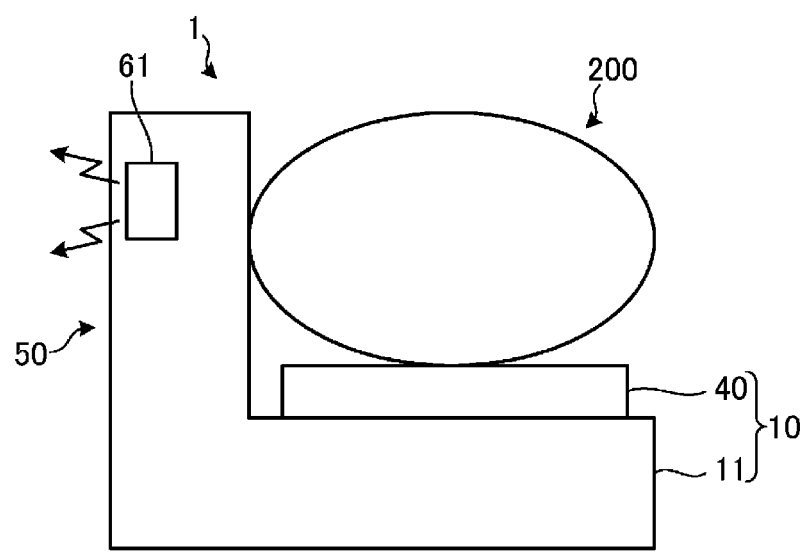
FIG. 14 is a schematic diagram illustrating a positional relationship between an antenna and a measurement target object in a weight measuring device according to an embodiment.

FIG. 13 is a schematic diagram illustrating a case in which the antenna 61 is disposed in the weight measurer 10. FIG. 14 is a schematic diagram illustrating a positional relationship between the antenna 61 and the measurement target object 200 in the weight measuring device 1 according to an embodiment. Here, the communication module 60 is disposed on the upper side of the weight measurer 10, and the antenna 61 included in the communication module 60 is also disposed on the upper side of the weight measurer 10. Thus, the communication module 60 can suppress, as much as possible, radio waves transmitted from the antenna 61 from being blocked by the measurement target object 200 placed on the tray 40 of the weight measurer 10. That is, when the antenna 61 is disposed in the weight measurer 10 for transmitting and receiving radio waves in wireless communication as illustrated in FIG. 13, the radio waves transmitted from the antenna 61 may easily be blocked by the measurement target object 200 placed on the weight measurer 10. In this case, ensuring communication performance in wireless communication may be difficult. In addition, when water is located near the antenna 61, radio wave attenuation in transmission and reception of radio waves in wireless communication is more likely to occur. That is, in a weight measuring device installed at a location where water is used (a so-called wet area), ensuring communication performance in wireless communication may be more difficult.

In contrast, in the weight measuring device 1 according to the present embodiment, since the antenna 61 is disposed on the upper side of the weight measurer 10 as illustrated in FIG. 14, the radio waves transmitted from the antenna 61 can be suppressed from being blocked by the measurement target object 200 placed on the weight measurer 10. Accordingly, the communication module 60 can more reliably transmit the measurement value of the weight of the measurement target object 200 to an external device capable of wireless communication, and ensure communication performance. Thus, the weight measuring device 1 can efficiently transmit the measurement value of the weight of the measurement target object 200 to an external device managing the measurement target object 200.

In the present embodiment, hand soap is used as the measurement target object 200, and the hand soap placed on the tray 40 of the weight measuring device 1 is not merely placed on the tray 40, but also used while placed on the tray 40. In general, the hand soap can be pushed out from a container for use by a pumping action caused by a user pushing a push portion 201 of the container. Typically, many hand soap containers are formed such that a portion to be pushed by a user of the hand soap is integrated with a portion to discharge the hand soap, but in the drawings according to the present embodiment, the detailed shape is omitted and the portion to be pushed is described as the push portion 201.

In the present embodiment, the weight measuring device 1 does not always measure the weight of the measurement target object 200, but measures the weight with the weight sensor 30 when it is detected that the measurement target object 200 placed on the tray 40 has been used. Whether the measurement target object 200 has been used is determined by the acceleration sensor 62. That is, when the push portion 201 of the measurement target object 200 is pushed to use the measurement target object 200, vibration is generated in the weight measuring device 1 by the pushing of the push portion 201. The acceleration sensor 62 detects the vibration and determines that the measurement target object 200 has been used. In other words, the acceleration sensor 62 detects acceleration of vibration when the push portion 201 of the measurement target object 200 is pushed, and thereby determines that the measurement target object 200 has been used.

Detected acceleration data by the acceleration sensor 62 is transmitted from the acceleration sensor 62 to the controller 80. The controller 80 determines whether or not the push portion 201 of the measurement target object 200 has been pushed based on the detected acceleration data transmitted from the acceleration sensor 62, and upon determining that the push portion 201 has been pushed, measures the weight of the measurement target object 200 with the weight sensor 30. Accordingly, the operation time of the weight sensor 30 can be shortened, and power consumption can be reduced.

Figure 15:
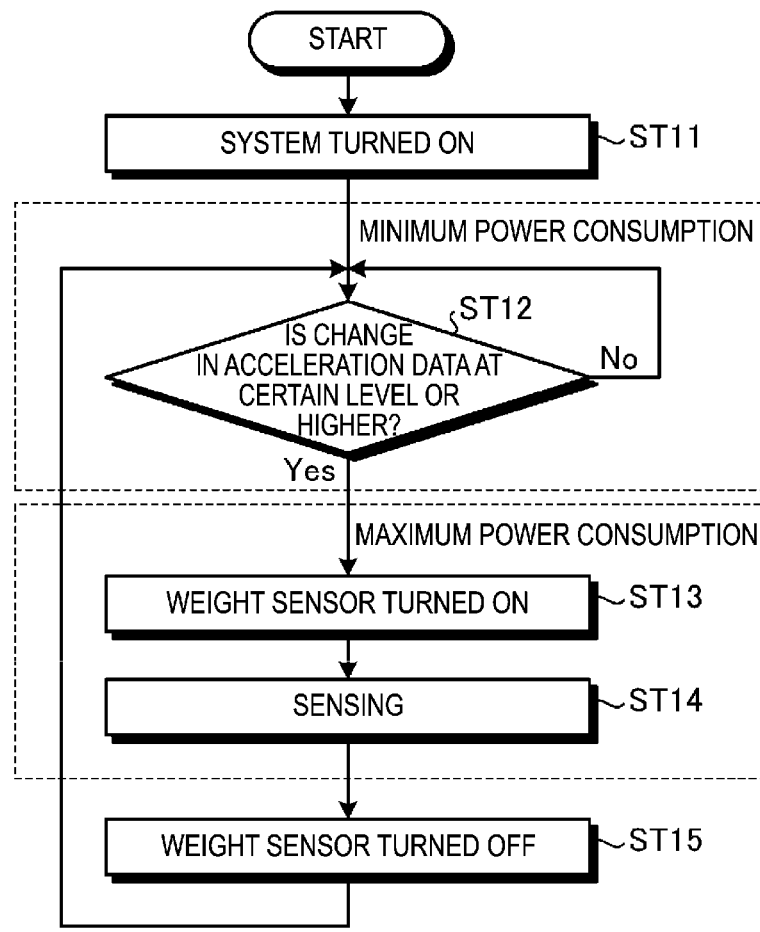
FIG. 15 is a flowchart showing a flow of operations when measuring weight with a weight measuring device according to an embodiment.

FIG. 15 is a flowchart showing a flow of operations when measuring weight with the weight measuring device 1 according to an embodiment. First, the system is turned on to use the weight measuring device 1 (step ST11). The system of the weight measuring device 1 is turned on, for example, by turning on a power switch (not illustrated) provided on the weight measuring device 1. When the system is turned on by operating a power switch or the like, the weight measuring device 1 can measure the weight of the measurement target object 200 using electrical power supplied from the battery 75 as a power supply. The hand soap, which is the measurement target object 200, may be placed on the tray 40 before the system is turned on, or may be placed on the tray 40 after the system is turned on.

In the weight measuring device 1, even when the system is turned on, the weight sensor 30 remains in an OFF state during standby in which the measurement target object 200 is not used. On the other hand, the acceleration sensor 62 operates by electrical power supplied from the battery 75 and detects acceleration transmitted to the acceleration sensor 62.

The controller 80 acquires acceleration data detected by the acceleration sensor 62 and determines whether or not the change in the acceleration data is at a certain level or higher (step ST12). The threshold value of the change in the acceleration data in this case is set in advance as a threshold value at which it can be determined that the push portion 201 of the measurement target object 200 has been pushed and the measurement target object 200 has been used, and is stored in the controller 80. The controller 80 compares the change in the acceleration data detected by the acceleration sensor 62 to the threshold value, and thereby determines whether or not the change in the acceleration data is at a certain level or higher.

When the change in the acceleration data is determined to be not at a certain level or higher (step ST12: No), the controller 80 continues to acquire the acceleration data detected by the acceleration sensor 62 and continues to determine whether or not the change in the acceleration data is at a certain level or higher.

On the other hand, when the change in the acceleration data is determined to be at a certain level or higher (step ST12: Yes), the controller 80 turns on the weight sensor 30 (step ST13). Then, the weight sensor 30 is operated by electrical power supplied from the battery 75.

The weight sensor 30, which has been turned on, performs weight sensing (step ST14). That is, the weight sensor 30 measures the weight of the measurement target object 200 placed on the tray 40. The weight sensor 30 transmits a measurement value of weight to the controller 80, and the controller 80 transmits the measurement value of the weight of the measurement target object 200 to an external device managing the measurement target object 200 with the communication module 60. Accordingly, the weight measuring device 1 can transmit the measurement value of the weight of the measurement target object 200 to convey the current remaining amount of the measurement target object 200 such as hand soap, which changes with use, and the external device that has received the measurement value of the weight can manage the remaining amount of the measurement target object 200.

Note that the measurement value of the weight of the measurement target object 200 transmitted from the weight measuring device 1 may be transmitted at an arbitrary timing, for example, once a day during a time period in which the measurement target object 200 is not in use, such as in the middle of the night. The timing at which the measurement value of the weight of the measurement target object 200 is transmitted is preferably set as appropriate in accordance with the usage pattern and/or the management method of the measurement target object 200.

When the change in the acceleration data is determined to be at a certain level or higher (step ST12: Yes), the weight sensor 30 is turned off after a predetermined period of time has passed (step ST15). That is, when a predetermined period of time has passed after the measurement target object 200 is determined to have been used and a situation arises in which the weight of the measurement target object 200 can be determined to be unchanged, the weight sensor 30 is turned off and the measurement of the weight of the measurement target object 200 is stopped.

When the weight sensor 30 is turned off, the processing returns to step ST12, and whether or not the change in the acceleration data detected by the acceleration sensor 62 is at a certain level or higher is determined.

The weight sensor 30 consumes a larger amount of electrical power than the acceleration sensor 62. Thus, when the weight sensor 30 is in the ON state (steps ST13 and ST14), the weight measuring device 1 consumes a large amount of electrical power. In contrast, when the weight sensor 30 is in the OFF state (step ST15), the weight measuring device 1 detects an acceleration with the acceleration sensor 62 with a small amount of electrical power consumption. In this manner, the weight measuring device 1 turns on the weight sensor 30 in a case where the push portion 201 of the measurement target object 200 is determined to have been pushed, and turns off the weight sensor 30 in other cases. Thus, a period of time during which the weight sensor 30 is turned off can be increased. Accordingly, a period of time during which the weight measuring device 1 is used with a small amount of electrical power consumption can be increased, and the electrical power consumption of the weight measuring device 1 can be reduced.

Variations

Figure 16:
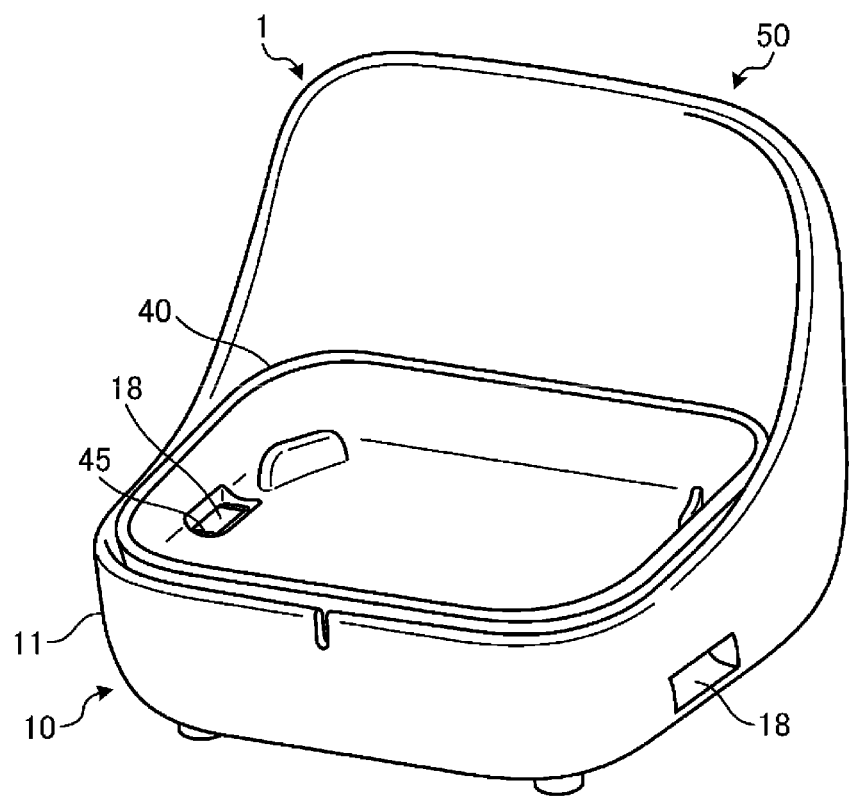
FIG. 16 illustrates a variation of a weight measuring device according to an embodiment, and is an explanatory diagram illustrating a case in which a drain hole is formed in a tray and a weight measurer body.
Figure 17:
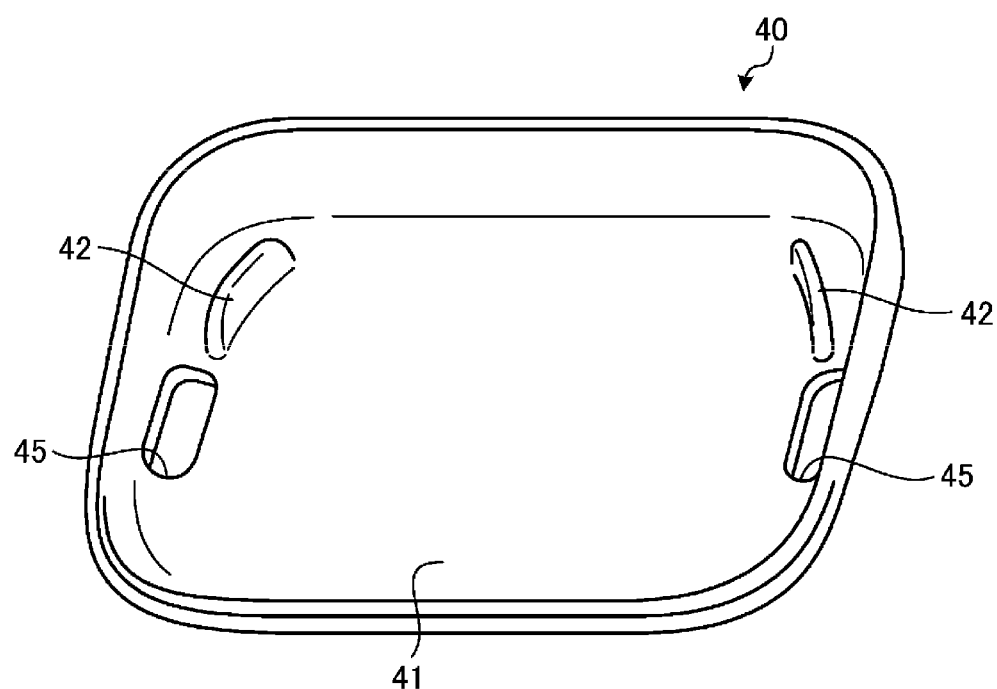
FIG. 17 is a perspective view of the tray illustrated in FIG. 16.
Figure 18:
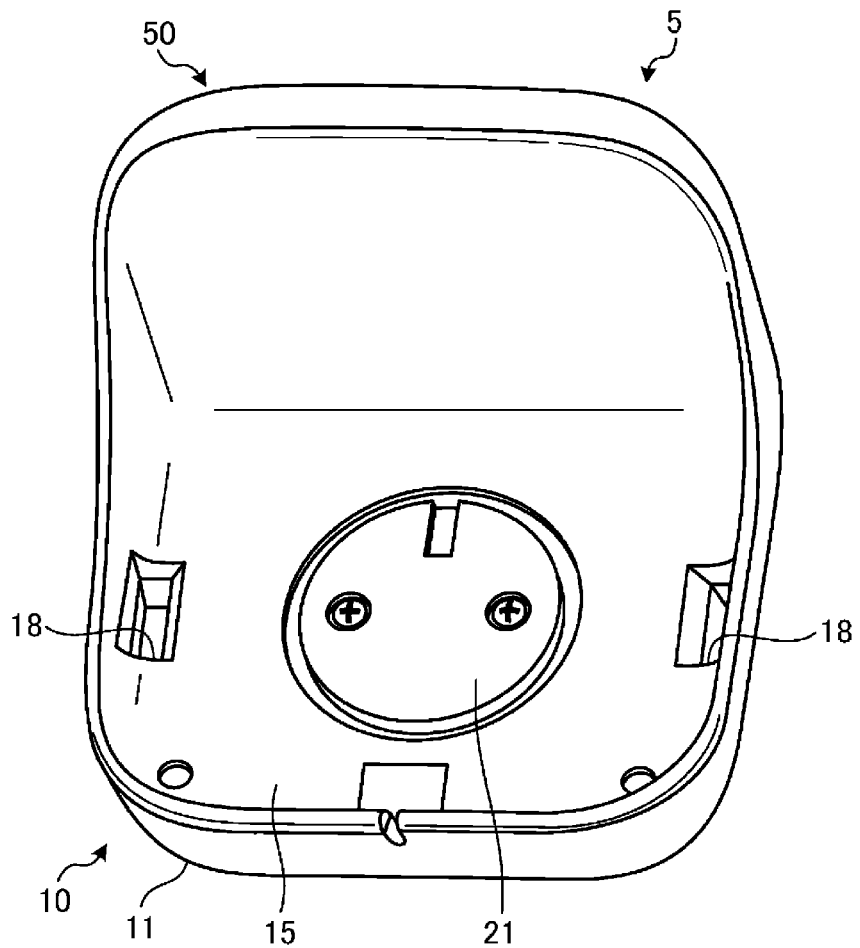
FIG. 18 is a perspective view of the body illustrated in FIG. 16.

Note that a drain hole may be formed in the weight measuring device 1 to allow for use in an environment in which contact with water is highly likely. FIG. 16 illustrates a variation of the weight measuring device 1 according to an embodiment, and is an explanatory diagram illustrating a case in which drain holes 45 and 18 are formed in the tray 40 and the weight measurer body 11, respectively, FIG. 17 is a perspective view of the tray 40 illustrated in FIG. 16. FIG. 18 is a perspective view of the body 5 illustrated in FIG. 16. The drain hole 45 may be formed in the tray 40 so that water on the upper surface 41 side of the tray 40 is drained to the lower side, and the drain hole 18 may be formed in the weight measurer body 11 of the body 5 so that water on the upper surface 15 side of the weight measurer body 11 is drained to the lower side. For example, the drain hole 45 of the tray 40 may be formed in two places near both ends of the tray 40 in the horizontal direction when the weight measuring device 1 is viewed from the front side as illustrated in FIG. 17. Similarly, for example, the drain hole 18 of the weight measurer body 11 may be formed in two places near both ends of the weight measurer body 11 in the horizontal direction when the weight measuring device 1 is viewed from the front side as illustrated in FIG. 18. As illustrated in FIG. 16, the drain holes 45 of the tray 40 and the drain holes 18 of the weight measurer body 11 are disposed at positions where the opening portions of the drain holes 18 of the weight measurer body 11 that are open in the upper surface 15 of the weight measurer body 11 overlap with the drain holes 45 of the tray 40.

Figure 19:
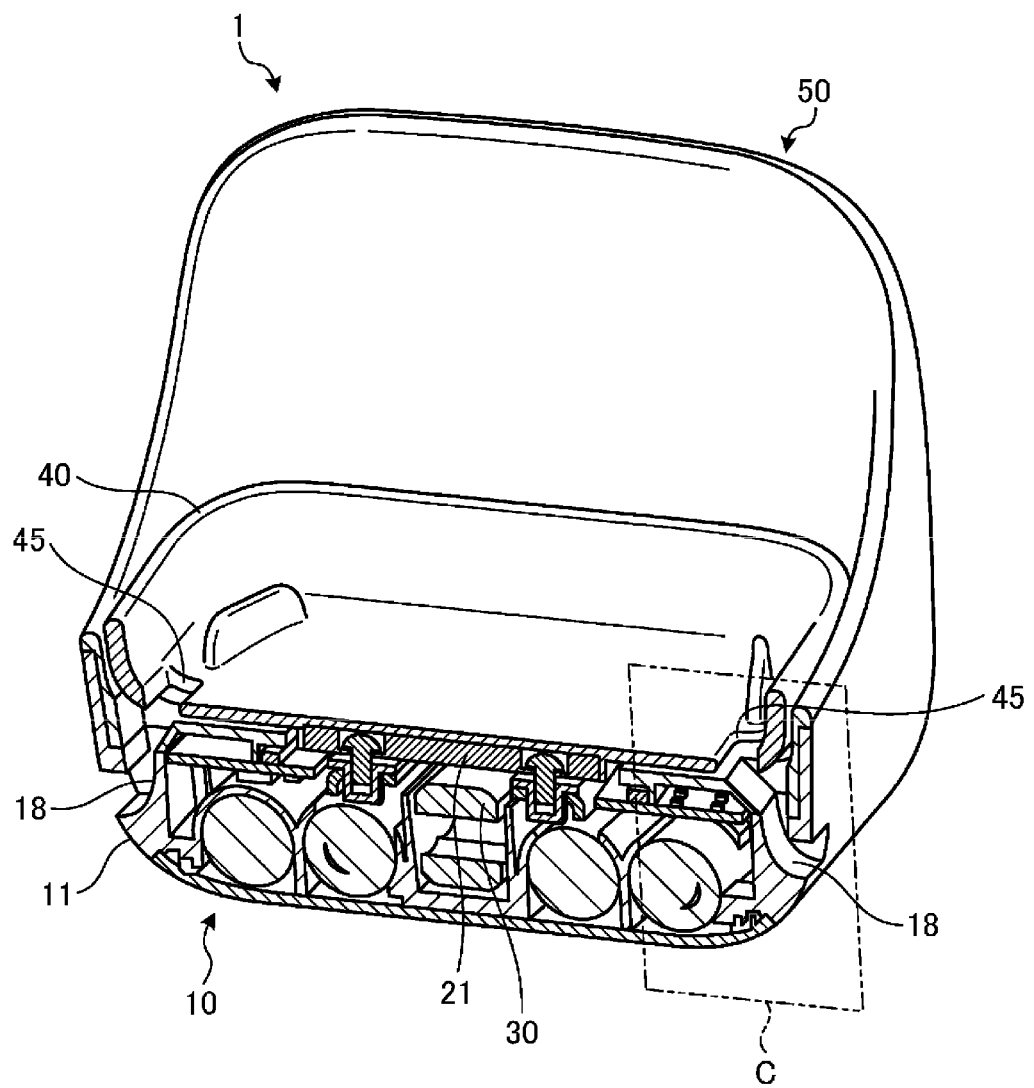
FIG. 19 is a cross-sectional view of the weight measuring device taken along the positions of the drain holes illustrated in FIG. 16.
Figure 20:
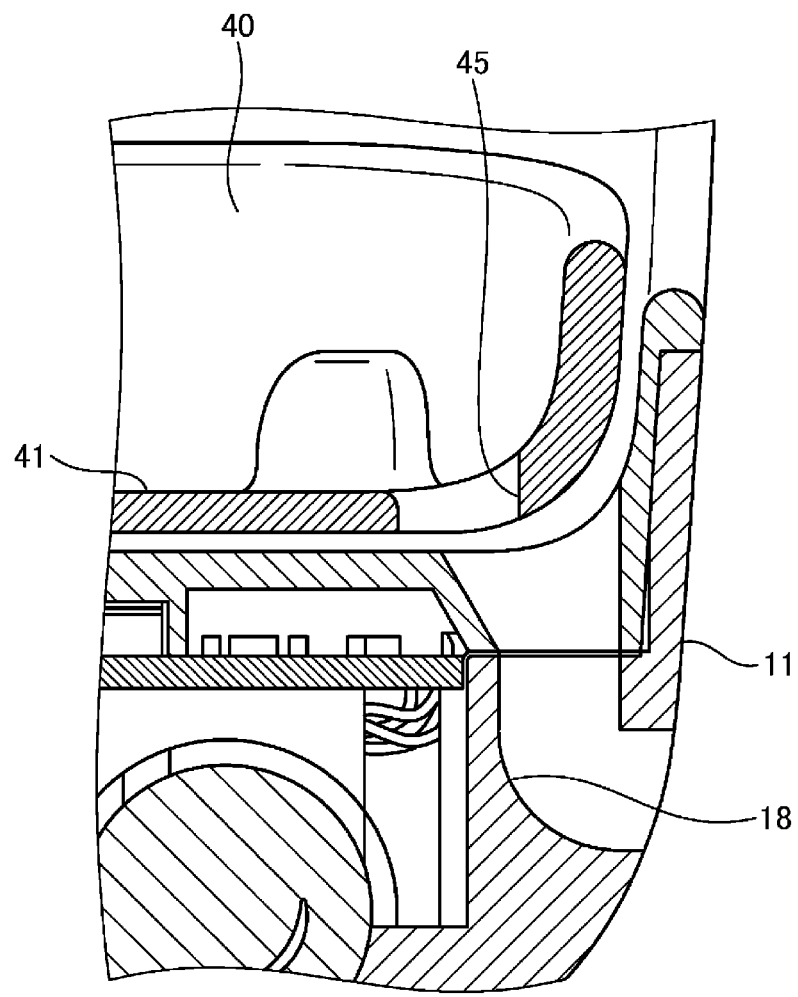
FIG. 20 is a detailed view of a portion C in FIG. 19.

FIG. 19 is a cross-sectional view of the weight measuring device 1 taken along the positions of the drain holes 45 and 18 illustrated in FIG. 16. FIG. 20 is a detailed view of the portion C in FIG. 19. As for the drain hole 18 of the weight measurer body 11 in the weight measuring device 1 illustrated in FIG. 16, the lower opening portion of the drain hole 18 is open in a side surface of the weight measurer body 11 at a position located on the lower side of the upper surface 15 of the weight measurer body 11 as illustrated in FIGS. 19 and 20. In addition, the drain hole 18 of the weight measurer body 11 is disposed such that the opening portion open in the upper surface 15 is located at a position overlapping with the drain hole 45 of the tray 40, and thus the drain hole 18 of the weight measurer body 11 and the drain hole 45 of the tray 40 communicate with each other. Thus, the drain holes 45 and 18 formed in the weight measuring device 1 communicate from the upper surface 41 of the tray 40 to a position at a side surface of the weight measurer body 11 on the lower side of the upper surface 15 of the weight measurer body 11.

Therefore, for example, in the weight measuring device 1 which uses hand soap as the measurement target object 200 and thus is used in an environment in which contact with water is highly likely, even when the tray 40 gets splashed with water, the water on the upper surface 41 of the tray 40 can be drained from the drain holes 45 and 18. Accordingly, even in a use environment in which contact with water is highly likely, water accumulation on the tray 40 can be suppressed, which is advantageous from a hygiene point of view. Further, errors in measurement values of the weight of the measurement target object 200 due to water accumulation on the tray 40 can be suppressed, and thus the accuracy of weight measurement can be improved. Furthermore, since water accumulation on the tray 40 can be prevented, the measurement target object 200 as hand soap can be suppressed from slipping on the tray 40 when the push portion 201 is pushed, and thus usability can be ensured.

Note that when the drain hole 45 is formed in the tray 40, the upper surface 41 of the tray 40 may be formed so as to be inclined in a downward direction toward the drain hole 45. Similarly, in the weight measurer body 11, the upper surface 15 of the weight measurer body 11 may be formed so as to be inclined in a downward direction toward the drain hole 18. When the upper surface 41 of the tray 40 and the upper surface 15 of the weight measurer body 11 are formed so as to be inclined in a downward direction toward the drain holes 45 and 18, respectively, water on the tray 40 and the weight measurer body 11 is easily drained from the drain holes 45 and 18.

Further, the upper surface 41 of the tray 40 and/or the upper surface 15 of the weight measurer body 11 may have a texture formed to ensure ease of water flow, or may be covered with a water-repellent coating. With these treatments, water on the tray 40 and the weight measurer body 11 easily flows toward the drain holes 45 and 18, and is easily drained from the drain holes 45 and 18. Accordingly, even when the weight measuring device 1 is used in an environment in which contact with water is highly likely, errors in weight measurement values due to water accumulation on the tray 40 and/or the weight measurer body 11 can be more reliably suppressed, and thus the accuracy of weight measurement can be improved.

The weight measuring device 1 may be configured to be able to determine the type of the measurement target object 200. FIG. 21 illustrates perspective views of trays 40 in each of which an identification portion 90 corresponding to the type of the measurement target object 200 to be placed is disposed. The tray 40 may be formed in different forms in accordance with the type of the measurement target object 200 to be placed, and may be configured to be able to identify the type of the measurement target object 200 to be placed. FIGS. 21A to 21D illustrate the trays 40 on which different measurement target objects 200 are to be placed. Each tray 40 is provided with the identification portion 90 identifying the type of the measurement target object 200 to be placed. Different types of identification portions 90 are set and disposed on the respective trays 40 in accordance with the measurement target objects 200 to be placed on the trays 40. In each of the trays 40 illustrated in FIG. 21, the identification portion 90 is formed of a projection projecting from the lower surface 46 of the tray 40.

As illustrated in FIGS. 21A to 21D, the identification portions 90 formed as projections are arranged at different positions in the respective trays 40 in accordance with the measurement target objects 200 to be placed on the trays 40. Thus, by differentiating the arrangement position of the identification portion 90 in the tray 40, the identification portion 90 is formed as a portion that can identify the type of the measurement target object 200 placed on the tray 40.

Figure 22:
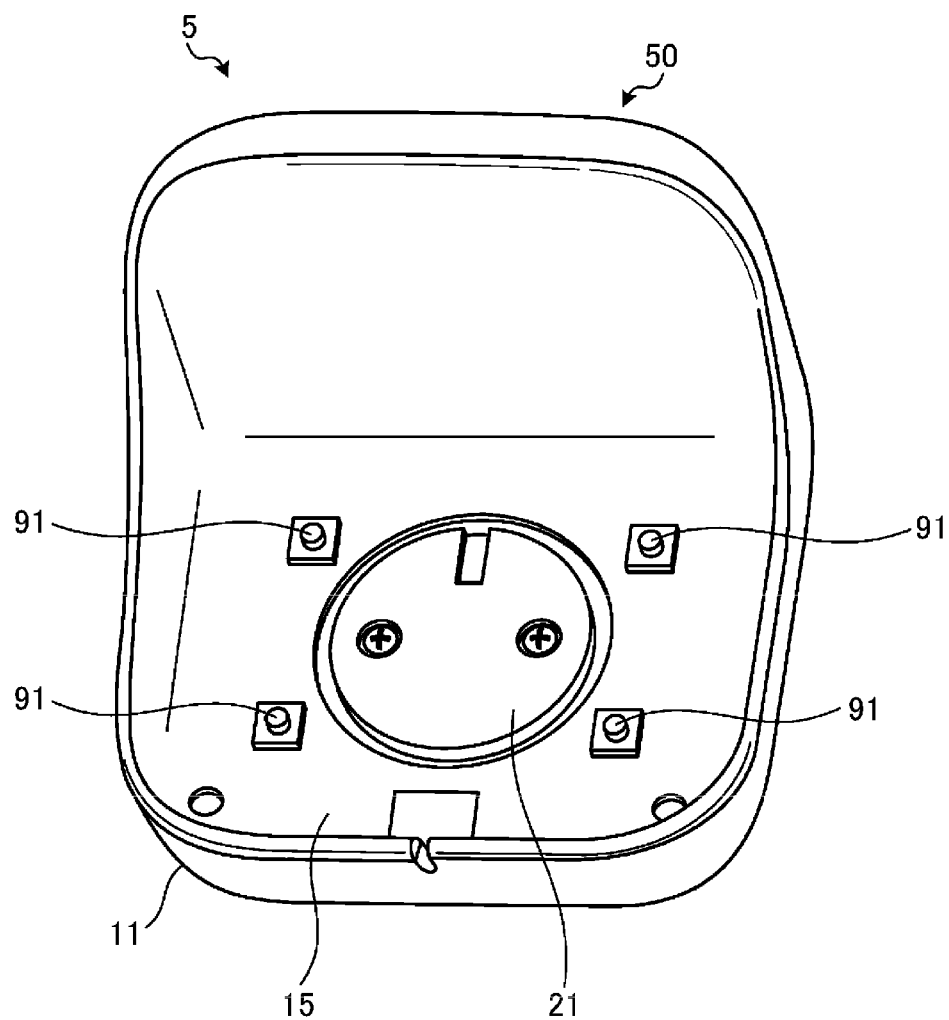
FIG. 22 is a perspective view of a body including identification portion detectors configured to detect the identification portions.

FIG. 22 is a perspective view of the body 5 including identification portion detectors 91 configured to detect the identification portions 90. When the identification portion 90 is disposed at the tray 40 so as to determine the type of the measurement target object 200, an identification portion detector 91 configured to detect the identification portion 90 is disposed in the body 5. For example, the identification portion detector 91 is disposed on the upper surface 15 of the weight measurer body 11 of the body 5 at a position corresponding to the position of the identification portion 90 of the tray 40 as illustrated in FIG. 22. That is, the identification portion detector 91 is disposed such that a plurality of identification portion detectors 91 are arranged at positions corresponding to the positions of the respective identification portions 90 of a plurality of types of the trays 40 that can be mounted on the tray receiver 21 of the weight measurer body 11, the arrangement positions of the identification portions 90 being different from each other.

The identification portion detector 91 includes, for example, a mechanical switch configured to detect the identification portion 90 by being pushed by the identification portion 90 formed by a projection. When the tray 40 is mounted on the tray receiver 21, among the plurality of identification portion detectors 91, the identification portion detector 91 corresponding to the arrangement position of the identification portion 90 of the tray 40 mounted at the tray receiver 21 can detect the arrangement position of the identification portion 90 of the tray 40 when pushed by the identification portion 90.

Figure 23:
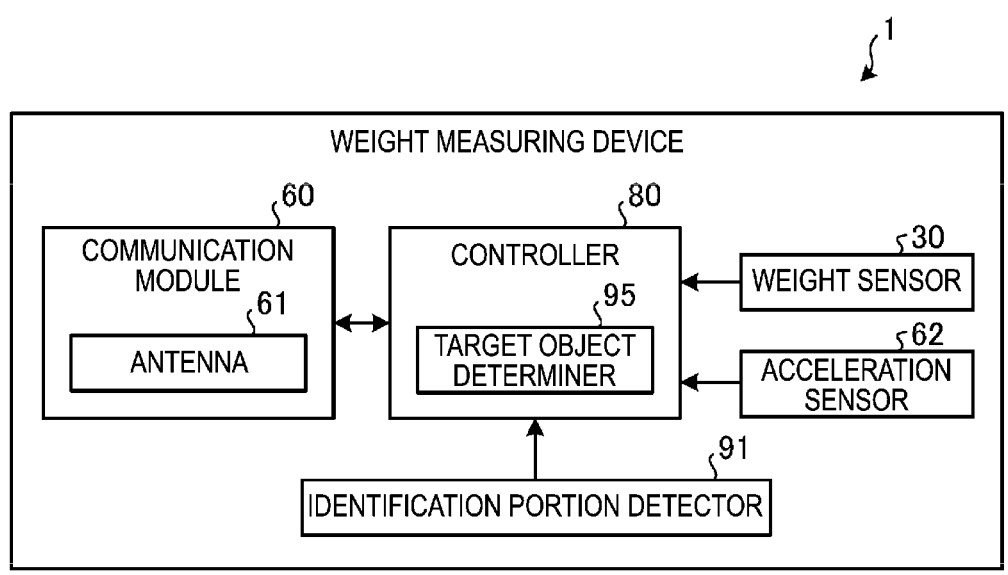
FIG. 23 is a block diagram illustrating a device configuration of a weight measuring device including identification portion detectors illustrated in FIG. 2122.

FIG. 23 is a block diagram illustrating a device configuration of the weight measuring device 1 including the identification portion detector 91 illustrated in FIG. 2122. The weight measuring device 1 including the identification portion detector 91 configured to detect the identification portion 90 of the tray 40 includes a target object determiner 95 configured to determine the type of the measurement target object 200 placed on the tray 40 based on the identification portion 90 disposed in the tray 40. The target object determiner 95 is functionally implemented by a program stored in the controller 80. The identification portion detector 91 is electrically connected to the controller 80, and the detection result by the identification portion detector 91 is transmitted from the identification portion detector 91 to the controller 80 and acquired by the controller 80.

While the identification portion detector 91 can detect the arrangement position of the identification portion 90 of the tray 40 mounted on the tray receiver 21, the target object determiner 95 determines the type of the measurement target object 200 placed on the tray 40 based on the arrangement position of the identification portion 90 detected by the identification portion detector 91. That is, since the identification portion 90 disposed in the tray 40 is arranged at a different position in accordance with the type of the measurement target object 200 to be placed on the tray 40, the target object determiner 95 determines the type of the measurement target object 200 placed on the tray 40 by acquiring the arrangement position of the identification portion 90 based on the detection result by the identification portion detector 91.

When the target object determiner 95 determines the type of the measurement target object 200, the controller 80 transmits the type of the measurement target object 200 together with a measurement value of the weight of the measurement target object 200 to an external device managing the measurement target object 200 with the communication module 60. In other words, when transmitting the measurement value of the weight of the measurement target object 200, the communication module 60 transmits the measurement value of the weight of the measurement target object 200 and the type of the measurement target object 200 determined by the target object determiner 95 in association with each other. This enables the external device managing the measurement target object 200 to manage the measurement target object 200 in accordance with the type of the measurement target object 200. Accordingly, when determining the necessity for replenishment of the measurement target object 200, even when a judgment criterion for a measurement value of the weight of the measurement target object 200 varies according to the type of the measurement target object 200, the necessity for replenishment of the measurement target object 200 can be appropriately determined, and the measurement target object 200 can be properly managed.

Note that the identification portion 90 disposed in the tray 40 is not limited to a projection, and the identification portion detector 91 that detects the identification portion 90 is not limited to a mechanical switch. For example, the identification portion 90 disposed in the tray 40 may be formed of a magnet, and the identification portion detector 91 may be a magnet sensor configured to detect the magnet. The configurations of the identification portion 90 and the identification portion detector 91 are not limited as long as the arrangement position of the identification portion 90 disposed in the tray 40 can be detected by the identification portion detector 91.

Figure 24:
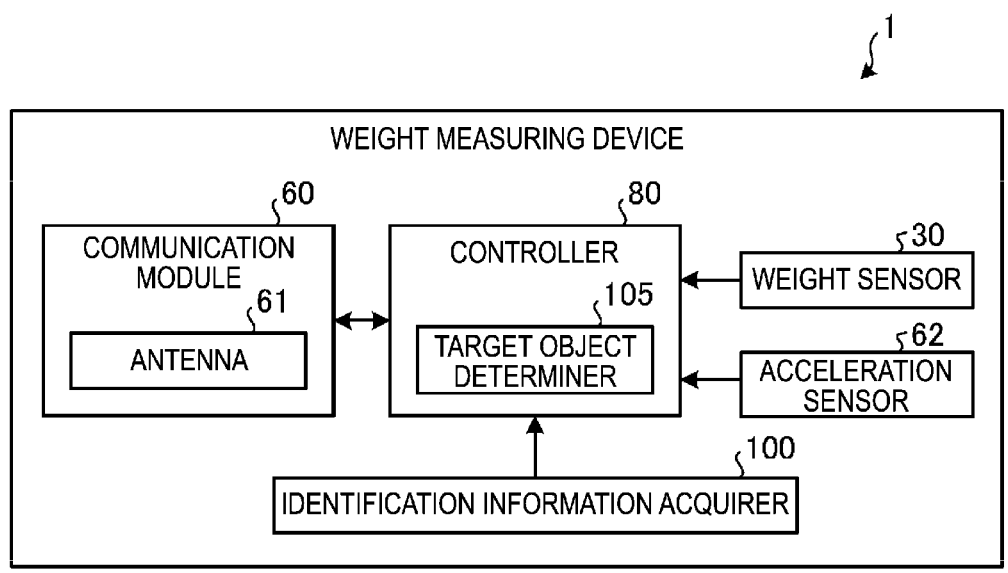
FIG. 24 is a block diagram illustrating a device configuration of a weight measuring device 1 including an identification information acquirer configured to read information about the measurement target object.

In addition, when the communication module 60 transmits a measurement value of the weight of the measurement target object 200, the communication module 60 may transmit the measurement value of the weight of the measurement target object 200 at a timing according to the type of the measurement target object 200 determined by the target object determiner 95. That is, the controller 80 of the weight measuring device 1 may determine the necessity for replenishment of the measurement target object 200 according to the type of the measurement target object 200 determined by the target object determiner 95, and the communication module 60 may transmit the measurement value of the weight of the measurement target object 200 to the external device managing the measurement target object 200 at a timing determined by the controller 80.

in addition, the type of the measurement target object 200 placed on the tray 40 may be determined by means other than the identification portion 90 and the identification portion detector 91. FIG. 24 is a block diagram illustrating a device configuration of the weight measuring device 1 including an identification information acquirer 100 configured to read information about the measurement target object 200. For example, the type of the measurement target object 200 placed on the tray 40 may be determined by providing the weight measuring device 1 with an identification information acquirer 100 configured to read information about the measurement target object 200 indicated on the measurement target object 200 and the type is determined based on the information about the measurement target object 200 acquired by the identification information acquirer 100.

In that case, as the identification information acquirer 100, for example, a camera configured to capture or an infrared sensor configured to read, by using infrared rays, a two-dimensional code that contains information about the type of the measurement target object 200 and the like and that is indicated on a surface of the measurement target object 200 is used. The identification information acquirer 100 is disposed, for example, in the arrangement unit 50 of the body 5. This enables the identification information acquirer 100 to acquire information indicated by a two-dimensional code or the like on a surface of the measurement target object 200 with the measurement target object 200 placed on the tray 40.

In the weight measuring device 1 including the identification information acquirer 100, a target object determiner 105 included in the controller 80 determines the type of the measurement target object 200 placed on the tray 40 based on the information about the measurement target object 200 acquired by the identification information acquirer 100. The target object determiner 105 determines the type of the measurement target object 200 placed on the tray 40 based on the information indicated on the measurement target object 200 as described above, and thus can determine the type of the measurement target object 200 more reliably.

Note that, when the identification information acquirer 100 is a camera, the identification information acquirer 100 may capture an image of the measurement target object 200, and the target object determiner 105 may extract features of the measurement target object 200 by performing predetermined image processing of the image of the measurement target object 200, and determine the type of the measurement target object 200 placed on the tray 40. For example, a camera as the identification information acquirer 100 may be installed in the arrangement unit 50 on the back side of the weight measuring device 1 (see FIG. 4). A user may have the camera capture an image of the measurement target object 200 by holding the measurement target object 200 in front of the camera before placing the measurement target object 200 on the weight measuring device 1. The target object determiner 105 may extract features of the measurement target object 200 by performing predetermined image processing of the captured image and determine the type of the measurement target object 200. Alternatively, the target object determiner 105 may determine the type of the measurement target object 200 when the weight measurer 10 detects a predetermined weight. In this case, the target object determiner 105 need not determine the type of the measurement target object 200 unless the predetermined weight is detected within a predetermined period of time after the capturing of the image of the measurement target object 200. Alternatively, the target object determiner 105 may make a provisional determination of the type of the measurement target object 200, and then when the predetermined weight is detected within a predetermined period of time after the capturing of the image of the measurement target object 200, may use the provisional determination result as a definitive determination. The target object determiner 105 may make a provisional determination of the type of the measurement target object 200, and then when the predetermined weight is not detected within a predetermined period of time after the capturing of the image of the measurement target object 200, may discard the provisional determination result.

The weight measuring device 1 described above can reduce the possibility that the weight measuring device 1 erroneously recognizes the type of the measurement target object 200 such as when the user accidentally causes the camera to capture an image of the measurement target object 200.

Figure 25:
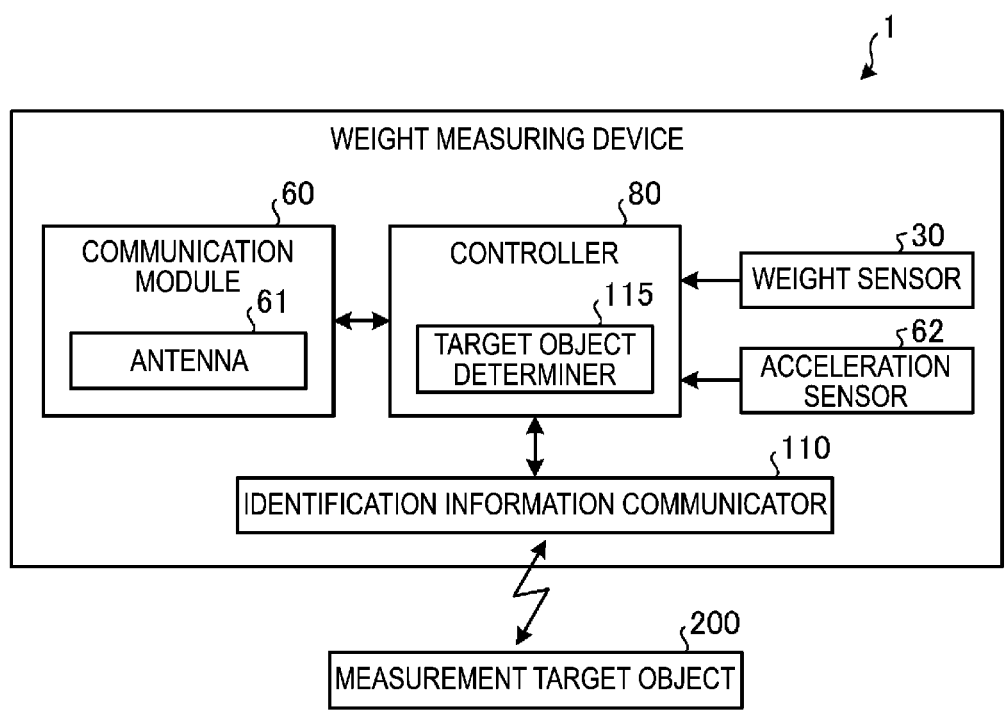
FIG. 25 is a block diagram illustrating a device configuration of a weight measuring device including an identification information communicator configured to communicate with the measurement target object.

In addition, the type of the measurement target object 200 placed on the tray 40 may be determined by communication between the weight measuring device 1 and the measurement target object 200. FIG. 25 is a block diagram illustrating a device configuration of the weight measuring device 1 including an identification information communicator 110 configured to communicate with the measurement target object 200. For example, the type of the measurement target object 200 placed on the tray 40 may be determined by providing the weight measuring device 1 with an identification information communicator 110 configured to acquire information about the measurement target object 200 by wireless communication with the measurement target object 200 and the type is determined based on the information about the measurement target object 200 acquired by the identification information communicator 110.

In that case, the wireless communication between the weight measuring device 1 and the measurement target object 200 uses, for example, a communication circuit capable of near-field wireless communication such as a radio frequency identifier (RFID) tag. That is, a communication circuit such as an RFID tag in which information about the measurement target object 200 such as the type of the measurement target object 200 is stored is disposed in the measurement target object 200, and the identification information communicator 110 performs wireless communication with the communication circuit disposed in the measurement target object 200. Accordingly, the identification information communicator 110 can acquire the information about the measurement target object 200 by wireless communication with the communication circuit disposed in the measurement target object 200.

In the weight measuring device 1 including the identification information communicator 110, a target object determiner 115 included in the controller 80 determines the type of the measurement target object 200 placed on the tray 40 based on the information about the measurement target object 200 acquired by the identification information communicator 110. The target object determiner 115 determines the type of the measurement target object 200 placed on the tray 40 based on the information acquired by wireless communication with the measurement target object 200 as described above, and thus can determine the type of the measurement target object 200 more reliably with high accuracy.

Note that, in the example described above, a medium (for example, an RFID tag) in which the information about the measurement target object 200 is stored is included in the measurement target object 200, but the medium may be included in the tray 40 or a user-owned terminal device (for example, a smartphone). For example, in the tray 40 designed in accordance with the type of the measurement target object 200, the tray 40 may include an RFID tag storing the identification information of the type of the measurement target object 200 corresponding to the tray 40. Upon detection of a predetermined trigger, the weight measuring device 1 may cause the identification information communicator 110 to acquire the identification information of the type of the measurement target object 200. In this manner, the target object determiner 115 may determine the type of the measurement target object 200 placed on the tray 40 based on the information acquired by wireless communication with the tray 40. The detection of the trigger may be, for example, detection of pressing of a physical key included in the weight measuring device 1 or detection of a predetermined weight (for example, the weight of the tray 40) by the weight measurer 10.

Also, the medium (for example, an RFID tag) in which the information about the measurement target object 200 is stored may be included in the user-owned terminal device (for example, a smartphone). Alternatively, the user-owned terminal device may store the identification information of the type of the measurement target object 200. The weight measuring device 1 may acquire the identification information of the type of the measurement target object 200 from the user-owned terminal device via wireless communication such as near-field wireless communication. In this manner, the target object determiner 115 may determine the type of the measurement target object 200 placed on the tray 40 based on the information acquired by wireless communication with the user-owned terminal device. For example, the user may input the type of the measurement target object 200 into a smartphone owned by the user. Upon receiving the user's operation, the smartphone may transmit identification information indicating the type of the measurement target object 200, which has been input, to the weight measuring device 1 by near-field wireless communication. The weight measuring device 1 may determine the type of measurement target object 200 placed on the tray 40 based on the received identification information indicating the type of the measurement target object 200.

Figure 26:
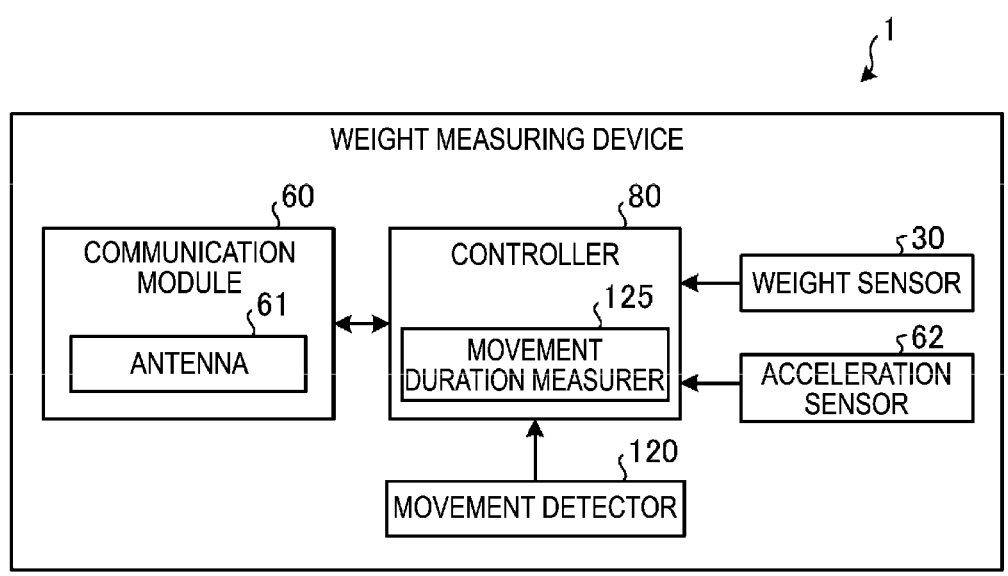
FIG. 26 is a block diagram illustrating a device configuration of a weight measuring device including a movement detector configured to detect the movement of a person who uses the measurement target object.

The weight measuring device 1 may also make a measurement other than the measurement of the weight of the measurement target object 200. FIG. 26 is a block diagram illustrating a device configuration of the weight measuring device 1 including a movement detector 120 configured to detect the movement of a person who uses the measurement target object 200. As illustrated in FIG. 26, the weight measuring device 1 may include, for example, a movement detector 120 configured to detect the movement of a person who uses the measurement target object 200, that is, a user, and a movement duration measurer 125 configured to measure the duration of a predetermined movement of the user based on the detection result of the movement detected by the movement detector 120.

In that case, as the movement detector 120, for example, an infrared sensor or a proximity sensor configured to detect the presence of a target object, a time-of-flight (ToF) camera that can measure three-dimensional information using time of flight of light, light detection and ranging (LIDAR) configured to measure a distance using light, or a microphone is used. The movement detector 120 is disposed, for example, in the body 5, and detects whether or not a hand is located near the measurement target object 200. The movement detector 120 detects the movement of the user of the measurement target object 200 placed on the tray 40, for example, by detecting the motion of a hand near the measurement target object 200.

The movement duration measurer 125 is functionally implemented by a program stored in the controller 80. The movement detector 120 is electrically connected to the controller 80, and the detection result by the movement detector 120 is transmitted from the movement detector 120 to the controller 80 so as to be acquired by the controller 80. The movement duration measurer 125 included in the controller 80 measures the duration of a predetermined movement of the user of the measurement target object 200 based on the detection of the movement of the user detected by the movement detector 120. For example, when the measurement target object 200 placed on the tray 40 is hand soap, the movement duration measurer 125 measures the duration of hand washing with the hand soap based on the detection result of the movement of the user using the hand soap by the movement detector 120.

When the communication module 60 transmits a measurement value of the weight of the measurement target object 200, the communication module 60 transmits the information based on the movement duration measured by the movement duration measurer 125 together with the measurement value of the weight. This enables an external device managing the measurement target object 200 to manage, for example, each hand wash duration measured per day or an average hand wash duration per day. Thus, more detailed data about a use pattern of the measurement target object 200 can be acquired and managed.

Figure 27:
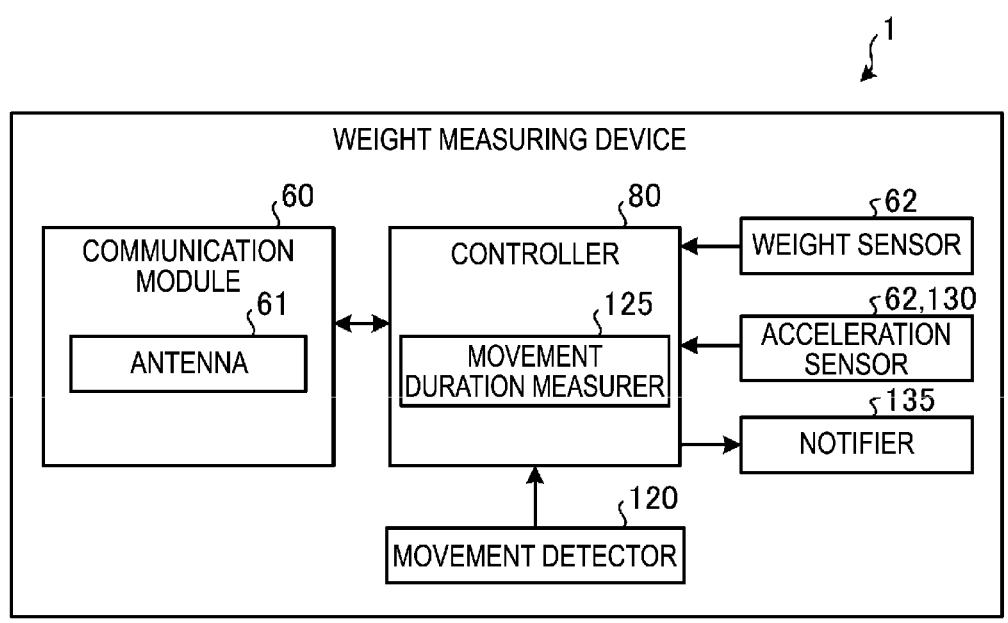
FIG. 27 is a block diagram illustrating a device configuration of a weight measuring device including an input detector configured to detect an input operation to the measurement target object.

Further, when measuring the movement duration of the user of the measurement target object 200, the measurement of the movement duration may be started when it is detected that an input operation to the measurement target object 200 has been performed. FIG. 27 is a block diagram illustrating a device configuration of the weight measuring device 1 including an input detector 130 configured to detect an input operation to the measurement target object 200. For example, the weight measuring device 1 may include an input detector 130 configured to detect an input operation to the measurement target object 200 as illustrated in FIG. 27, and the movement duration measurer 125 of the controller 80 may measure a movement duration when the input detector 130 detects that an input operation to the measurement target object 200 has been performed.

In that case, for example, the acceleration sensor 62 may be used as the input detector 130. For example, when the measurement target object 200 is hand soap, the acceleration sensor 62 detects that the user has pushed the push portion 201 of the measurement target object 200, and thus the acceleration sensor 62 may be used as the input detector 130 that detects an input operation to the measurement target object 200.

When the input detector 130, which is the acceleration sensor 62, detects that an input operation to the measurement target object 200 has been performed, the movement duration measurer 125 of the controller 80 may start measuring the duration of a predetermined movement of the user. That is, when the input detector 130 detects that the push portion 201 of the measurement target object 200 has been pushed, the movement duration measurer 125 starts measuring the duration of movement of hand washing with hand soap and keeps detecting the duration of hand washing until the movement detector 120 detects that the movement of hand washing has been finished. Note that the input detector 130 is not limited to the acceleration sensor 62, and for example, the weight sensor 30 may be used.

Further, the weight measuring device 1 may include a notifier 135 configured to make a notification about the duration of a predetermined movement of the user as illustrated in FIG. 27. As for the notifier 135, the weight measuring device 1 may include, for example, a speaker or a display device, and the speaker or the display device may be used as the notifier 135. Alternatively, the weight measuring device 1 may include a communicator that can perform wireless communication with a communication device (not illustrated) such as a smartphone owned by the user of the measurement target object 200 and transmit notification data to the communication device, and such a communicator may be used as the notifier 135.

The notifier 135 included in such a form in the weight measuring device 1 may make a predetermined notification to the user based on the movement duration measured by the movement duration measurer 125. For example, when the duration of movement of hand washing measured by the movement duration measurer 125 is short, the notifier 135 may notify the user that hand washing is insufficient by voice from the speaker or a message indicated by the display device. Accordingly, an added value of the weight measuring device 1 can be increased.

In the embodiments described above, the arrangement unit 50 formed extending toward the upper side from the weight measurer 10 extends toward the upper side from a part of the weight measurer 10, but the arrangement unit 50 may be formed extending toward the upper side from the entire circumference of the weight measurer 10 when the weight measurer 10 is viewed from the vertical direction. That is, the weight measuring device 1 may be formed, on the whole, in a bottomed tubular shape that is closed on one end side, and the weight measurer 10 may be disposed on the closed side. When the weight measuring device 1 is formed in a bottomed tubular shape on the whole, the retainability of the measurement target object 200 whose weight is measured can be ensured, and thus the weight of the measurement target object 200 can be stably measured.

Additionally, in the embodiments described above, the battery 75 is used as a power supply, but the power supply is not limited to the battery 75, and, for example, a commercial power source may be used.

Additionally, the embodiments and the variations described above may be combined as appropriate in one weight measuring device 1. Regardless of the configuration of the weight measuring device 1, communication performance can be ensured by disposing the antenna 61 of the communication module 60 on the upper side of the weight measurer 10 that measures the weight of the measurement target object 200.

In the embodiments described above, description has been given using hand soap as an example of the measurement target object 200 whose weight is measured by the weight measuring device 1. However, the measurement target object 200 whose weight is measured by the weight measuring device 1 is not limited to hand soap. In a case where the measurement target object 200 is a container, the container may be any container as long as the container contains an object whose weight changes when the object is used by the user. The measurement target object 200 may be, for example, a container containing a beauty essence such as skin lotion or perfume, a container containing a beverage such as water or alcohol, a container containing a seasoning such as pepper, or a container containing an agent such as a medical or chemical agent. In a case where the measurement target object 200 is a container containing a predetermined object (for example, any of those described above), the state of the object contained in the container is not limited to liquid. That is, the state of the object contained in the container may be gel, foam, or powder. The state of the object contained in the container may be solid, Examples of a container containing a solid object include a medicine box containing a plurality of tablets. In addition, the measurement target object 200 may be an object whose weight changes when used by the user such as a solid soap.

Embodiments have been described in order to fully and clearly disclose the technology according to the appended claims. However, the appended claims are not to be limited to the embodiments described above, and should be configured to embody all modifications and alternative configurations that those skilled in the art may make within the underlying matter set forth herein.

REFERENCE SIGNS

1 Weight measuring device
5 Body
6 Housing
10 Weight measurer
11 Weight measurer body
15, 41 Upper surface
16 Opening hole
18, 45 Drain hole
21 Tray receiver (upper part)
22 Nut member (lower part)
23 Screw (connection member)
25 Flexible sheet
28 Double-sided tape
30 Weight sensor
40 Tray (placement portion)
50 Arrangement unit
60 Communication module (communicator)
61 Antenna
62 Acceleration sensor
70 Substrate
75 Battery
80 Controller
90 Identification portion
91 Identification portion detector
95 Target object determiner
100 Identification information acquirer
105 Target object determiner
110 Identification information communicator
115 Target object determiner
120 Movement detector
125 Movement duration measurer
130 Input detector
135 Notifier
200 Measurement target object
201 Push portion

The invention claimed is:

1. A weight measuring device comprising:
a weight measurer configured to have an object placed thereon and measure a weight of the object, the weight measurer comprising:
a weight sensor configured to measure a weight of the object,
a housing configured to house the weight sensor,
a lower part housed in the housing, the lower part being configured to send a first load to the weight sensor, and
an upper part disposed on an upper side of the lower part, the upper part being configured to send a second load to the lower part, the second load input from the object;
a first communicator configured to transmit a value of the weight of the object; and
an arrangement unit formed in an upper part of the weight measurer, the arrangement unit being configured to have at least an antenna of the first communicator disposed on an upper side of the weight measurer.

2. The weight measuring device according to claim 1, wherein
the first load is input from outside of the housing; and
the weight measurer comprises:
an opening hole formed in the housing, the opening hole that penetrates the housing from an inner side to an outer side of the housing; and
a flexible sheet that closes the opening hole, wherein
the upper part and the lower part are oppose each other through the flexible sheet, and
the upper part is further configured to send the second load to the lower part via the flexible sheet.

3. The weight measuring device according to claim 2, wherein
the upper part and the lower part are connected to each other by a connection member,
a flexible sheet comprises a connecting hole, the connecting hole which the connection member passes through, and
the upper part and the lower part are separated from each other at a position of the connecting hole.

4. The weight measuring device according to claim 1, wherein
the weight measurer comprises:
a weight measurer body comprising a weight sensor, the weight sensor configured to measure the weight of the object; and
a placement portion formed to be removable from the weight measurer body, the placement portion being configured to have the object placed thereon and send the weight of the object to the weight sensor.

5. The weight measuring device according to claim 4, wherein
 a drain hole is formed in each of the placement portion and the weight measurer body, and the drain hole drains water on an upper surface side to a lower side.

6. The weight measuring device according to claim 5, wherein
 the upper surface of each of the placement portion and the weight measurer body is inclined in a downward direction toward the drain hole.

7. The weight measuring device according to claim 4, further comprising:
 an identification portion disposed in the placement portion, the identification portion being configured to be of a different type according to the object to be placed on the placement portion; and
 a determiner configured to determine a type of the object based on the identification portion.

8. The weight measuring device according to claim 7, wherein
 the identification portion is disposed at a different position on the placement portion according to the object to be placed on the placement portion, and
 the determiner is configured to determine the type of the object based on an arrangement position of the identification portion.

9. The weight measuring device according to claim 4, further comprising:
 acquirer configured to read information about the object indicated on the object; and
 a determiner configured to determine a type of the object based on the information about the object acquired by the acquirer.

10. The weight measuring device according to claim 4, further comprising
 a second communicator configured to acquire information about the object by wireless communication with the object, and
 a target object determiner configured to determine a type of the object based on the information about the object acquired by the second communicator.

11. The weight measuring device according claim 7, wherein
 the first communicator is further configured to transmit a measurement value of the weight of the object and the type of the object determined by the determiner in association with each other.

12. The weight measuring device according to claim 7, wherein
 the first communicator is further configured to transmit a measurement value of the weight of the object at a timing according to the type of the object determined by the determiner.

13. The weight measuring device according to claim 1, further comprising:
 a movement detector configured to detect a movement of a person who uses the object; and
 a duration measurer configured to measure a duration of a predetermined movement of the person based on a detection result of the movement.

14. The weight measuring device according to claim 13, further comprising:
 an input detector configured to detect an input operation to the object, wherein
 the duration measurer is configured to measure the duration of the movement when the input detector detects that the input operation to the object has been performed.

15. The weight measuring device according to claim 13, further comprising:
 a notifier configured to make a notification about the duration of the movement, wherein
 the notifier configured to make a notification based on the duration of the movement.

16. The weight measuring device according to claim 13, wherein
 the first communicator is configured to transmit information based on the duration of the movement.

* * * * *